US011302984B2

(12) United States Patent
Yoshida et al.

(10) Patent No.: US 11,302,984 B2
(45) Date of Patent: Apr. 12, 2022

(54) BATTERY MODULE AND BATTERY MONITORING UNIT MOUNTING STRUCTURE

(71) Applicant: Yazaki Corporation, Tokyo (JP)

(72) Inventors: Haruhiko Yoshida, Shizuoka (JP); Kimihiro Matsuura, Shizuoka (JP); Hidehiko Shimizu, Shizuoka (JP); Yuki Chiyajo, Shizuoka (JP); Keitaro Nozawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 236 days.

(21) Appl. No.: 16/720,831

(22) Filed: Dec. 19, 2019

(65) Prior Publication Data

US 2020/0127259 A1    Apr. 23, 2020

Related U.S. Application Data

(63) Continuation of application No. PCT/JP2018/019244, filed on May 18, 2018.

(30) Foreign Application Priority Data

Jul. 18, 2017 (JP) .............................. JP2017-138942

(51) Int. Cl.
*H01M 10/42* (2006.01)
*H01M 50/20* (2021.01)
*H01M 50/502* (2021.01)
*H01M 50/543* (2021.01)

(52) U.S. Cl.
CPC .......... *H01M 50/20* (2021.01); *H01M 10/425* (2013.01); *H01M 50/502* (2021.01); *H01M 50/543* (2021.01); *H01M 2010/4271* (2013.01)

(58) Field of Classification Search
CPC .......... H01M 2/10; H01M 10/42; H01M 2/20; H01M 2/30; H01M 10/425; H01M 50/502;
(Continued)

(56) References Cited

U.S. PATENT DOCUMENTS

2012/0003505 A1 *   1/2012   Kim ................... H01M 10/425
                                                            429/7
2013/0189549 A1    7/2013   Nemoto
(Continued)

FOREIGN PATENT DOCUMENTS

CN          104900939 A      9/2015
JP          2013-175442 A    9/2013
(Continued)

OTHER PUBLICATIONS

JP2014010984MT (Year: 2014).*
(Continued)

*Primary Examiner* — Alexander Usyatinsky
(74) *Attorney, Agent, or Firm* — Sughrue Mion, PLLC

(57) ABSTRACT

A pair of end plates is a pair of members provided at both ends of a battery cell assembly in an array direction to clamp the battery cell assembly from both sides in the array direction. The pair of end plates has a plate upper surface and a recess. The plate upper surface is positioned on the same side as that of an electrode mounting surface. The recess is recessed from the plate upper surface and accommodates at least part of a coupling connector. With this configuration, a battery module and a battery monitoring unit mounting structure can prevent the battery module from increasing in size.

11 Claims, 20 Drawing Sheets

(58) Field of Classification Search
CPC .............. H01M 50/20; H01M 50/543; H01M 2010/4271; Y02E 60/10
See application file for complete search history.

(56) References Cited

U.S. PATENT DOCUMENTS

| | | | |
|---|---|---|---|
| 2015/0111073 A1* | 4/2015 | Deriha | H01M 50/20 |
| | | | 429/61 |
| 2015/0144409 A1 | 5/2015 | Fujii | |
| 2016/0072116 A1 | 3/2016 | Yanagihara et al. | |
| 2017/0141365 A1 | 5/2017 | Kim et al. | |
| 2018/0088179 A1* | 3/2018 | Ota | H05K 1/118 |
| 2018/0190965 A1* | 7/2018 | Lee | H01R 13/5202 |

FOREIGN PATENT DOCUMENTS

| | | | |
|---|---|---|---|
| JP | 2014-010984 A | | 1/2014 |
| JP | 2014-011060 A | | 1/2014 |
| JP | 2014010984 | * | 1/2014 |
| JP | 2015-022965 A | | 2/2015 |
| JP | 2015022965 | * | 2/2015 |
| JP | 2015-046354 A | | 3/2015 |
| JP | 2015-049932 A | | 3/2015 |
| JP | 2017-111969 A | | 6/2017 |
| WO | 2014034079 A1 | | 3/2014 |
| WO | 2014/147809 A1 | | 9/2014 |
| WO | 2017/104942 A1 | | 6/2017 |

OTHER PUBLICATIONS

JP 2015022965 MT (Year: 2015).*
Decision to Granta Patent Japanese Patent Application No. 2017-138942 (Year: 2020).*
Notification of Reasons for Refusal of Japanese Application No. 2017-138942 dated Aug. 13, 2019.

* cited by examiner

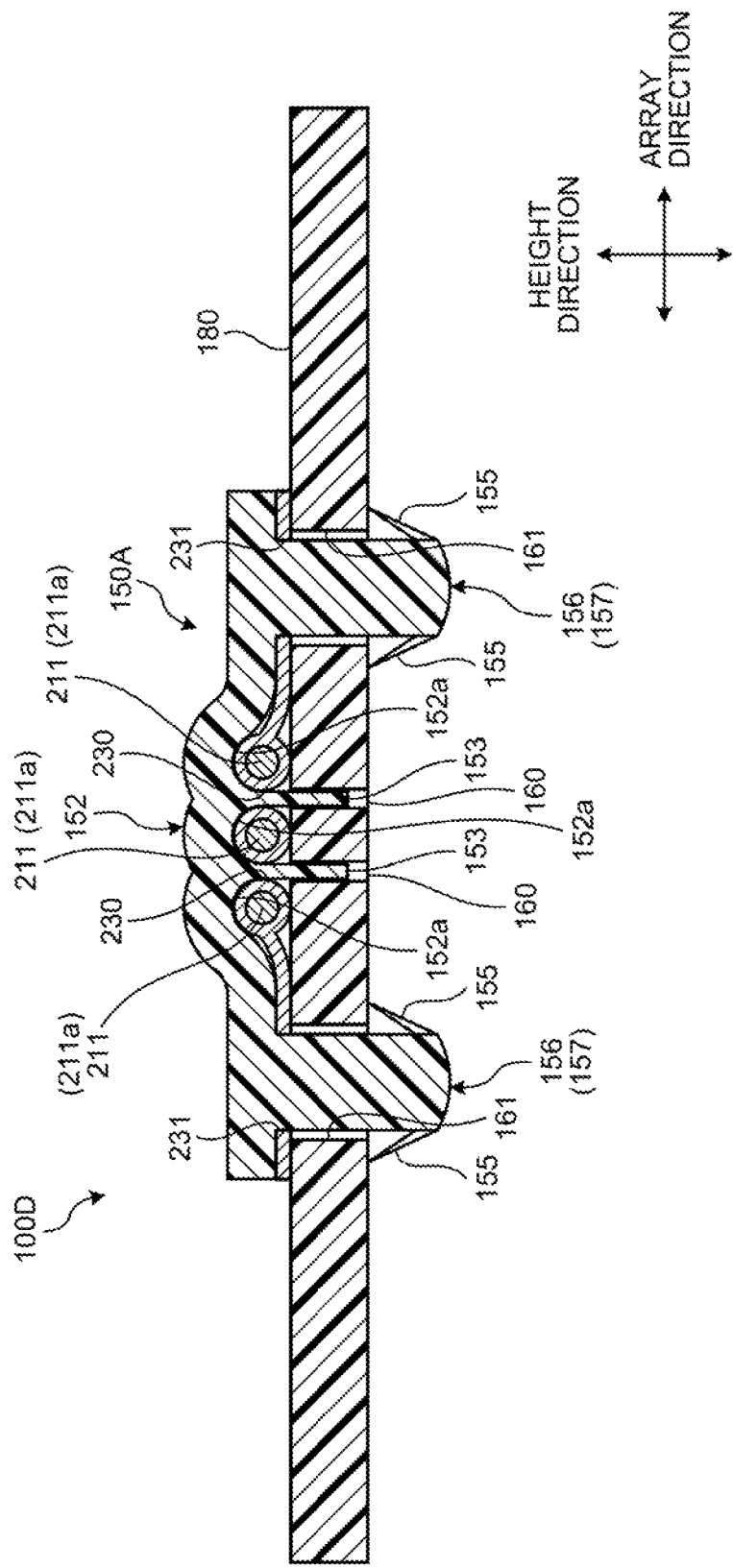

BATTERY MODULE AND BATTERY MONITORING UNIT MOUNTING STRUCTURE

CROSS-REFERENCE TO RELATED APPLICATION(S)

This application is a continuation application of International Application PCT/JP2018/019244, filed on May 18, 2018 which claims the benefit of priority from Japanese Patent application No. 2017-138942 filed on Jul. 18, 2017 and designating the U.S., the entire contents of which are incorporated herein by reference.

BACKGROUND OF THE INVENTION

1. Field of the Invention

The present invention relates to a battery module and a battery monitoring unit mounting structure.

2. Description of the Related Art

Conventionally, battery modules are provided to vehicles, such as electric cars, to supply electric power to driving sources for traveling of the vehicles. A battery module, for example, includes a battery cell assembly, a pair of end plates, and a battery monitoring unit (Japanese Patent Application Laid-open No. 2014-011060). The battery cell assembly includes a plurality of battery cells disposed side by side in an array direction and electrically connected to one another. The pair of end plates is provided at both ends of the battery cell assembly in the array direction and clamps the battery cell assembly from both sides in the array direction. The battery monitoring unit is mounted on the battery cell assembly and outputs the results of monitoring the battery state of the battery cells to an external device.

When the battery monitoring unit is mounted on the battery cell assembly, the entire conventional battery module tends to increase in size. From this point of view, the conventional battery module can be further improved.

SUMMARY OF THE INVENTION

In view of the disadvantage described above, an object of the present invention is to provide a battery module and a battery monitoring unit mounting structure that can prevent the battery module from increasing in size.

In order to solve the above mentioned problem and achieve the object, a battery module according to one aspect of the present invention includes a battery cell assembly including a plurality of battery cells each including an electrode terminal, disposed side by side in an array direction, and electrically connected to one another, the battery cell assembly having an electrode mounting surface provided with the electrode terminal; a battery monitoring unit including a coupling connector capable of being connected to a mating connector of an external device, mounted on the electrode mounting surface, and configured to output a battery state of the battery cells to the external device via the coupling connector; and a pair of end plates provided at both ends of the battery cell assembly in the array direction to clamp the battery cell assembly from both sides in the array direction, wherein the pair of end plates has a plate upper surface positioned on the same side as the side of the electrode mounting surface and a recess recessed from the plate upper surface to accommodate at least part of the coupling connector, and the coupling connector is located at a position on the battery cell assembly side with respect to an end side in the array direction of the pair of end plates.

According to another aspect of the present invention, in the battery module, it is preferable that the battery monitoring unit includes a substrate provided with an electronic circuit, and the coupling connector is positioned between a bottom of the recess and the substrate and provided to the substrate such that the mating connector is capable of being attached to and detached from the coupling connector along the array direction.

According to still another aspect of the present invention, in the battery module, it is preferable that the battery monitoring unit includes a substrate provided with an electronic circuit, and the coupling connector is positioned at an end of the substrate in the array direction and provided to the substrate such that the mating connector is capable of being attached to and detached from the coupling connector along the array direction.

According to still another aspect of the present invention, in the battery module, it is preferable that the recess accommodates an entire of the coupling connector.

According to still another aspect of the present invention, in the battery module, it is preferable that the battery monitoring unit includes a substrate on which an electronic circuit is formed, and a connector coupling wire connecting the substrate and the coupling connector, and the recess accommodates a part of the connector coupling wire.

In order to achieve the object, a battery monitoring unit mounting structure according to still another aspect of the present invention includes a pair of end plates provided at both ends of a battery cell assembly in an array direction to clamp the battery cell assembly from both sides in the array direction, the battery cell assembly including a plurality of battery cells each including an electrode terminal, disposed side by side in the array direction, and electrically connected to one another, the battery cell assembly having an electrode mounting surface provided with the electrode terminal, wherein the pair of end plates has: a plate upper surface positioned on the same side as the side of the electrode mounting surface; and a recess recessed from the plate upper surface to accommodate at least part of a coupling connector of a battery monitoring unit including the coupling connector capable of being connected to a mating connector of an external device, mounted on the electrode mounting surface, and configured to output a battery state of the battery cells to the external device via the coupling connector, and the coupling connector is located at a position on the battery cell assembly side with respect to an end side in the array direction of the pair of end plates.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is a sectional view of an example of electric-wire mounting according to a modification of the fifth reference example.

DETAILED DESCRIPTION OF THE PREFERRED EMBODIMENTS

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. Various omissions, substitutions and changes of the components may be made without departing from the spirit of the present invention.

First Embodiment

Figure 1:
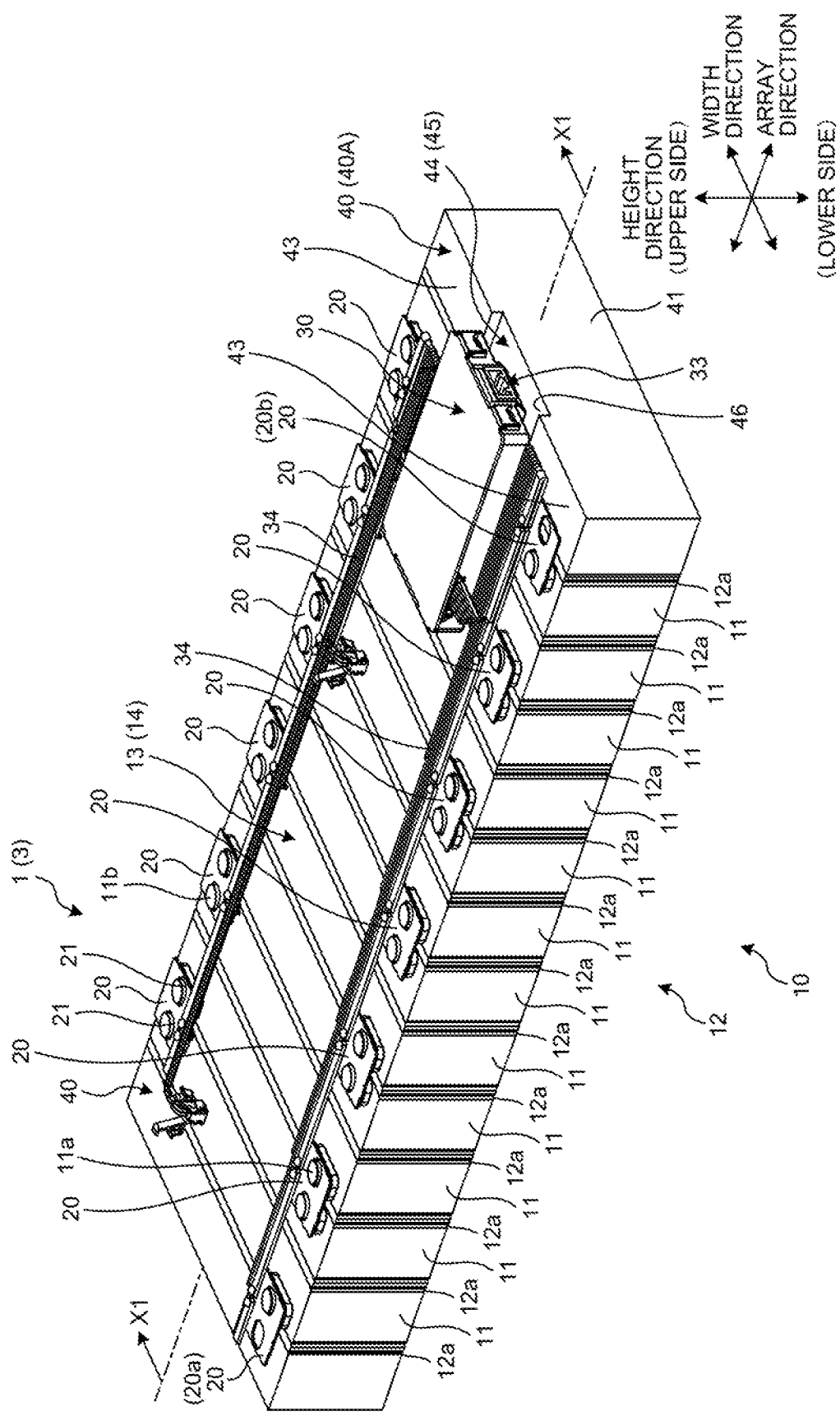
FIG. 1 is a perspective view of an exemplary configuration of a battery module according to a first embodiment.
Figure 2:
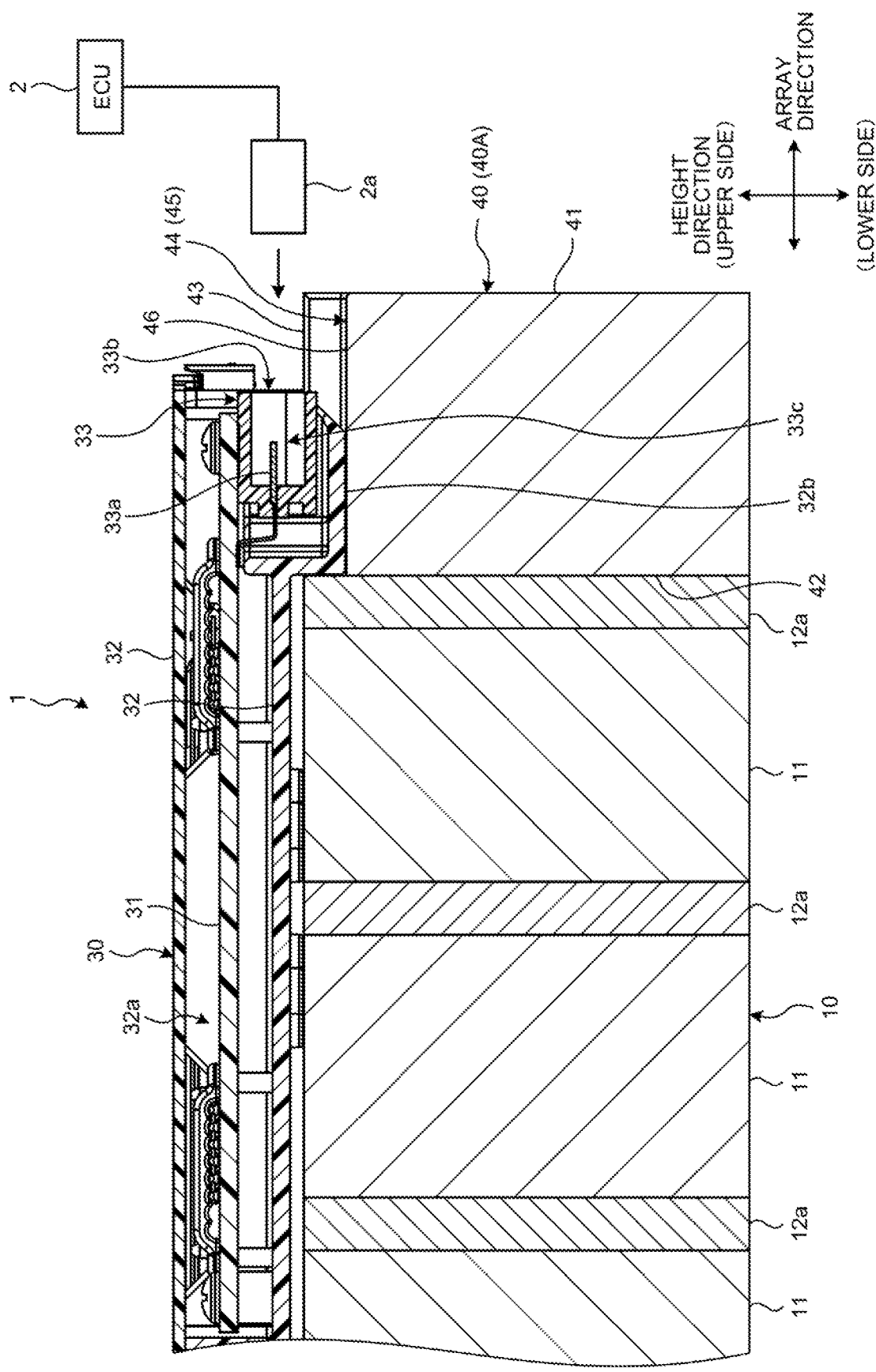
FIG. 2 is a main-part sectional view along line X1-X1 in FIG. 1.

A battery module 1 according to a first embodiment is described. The battery module 1 is a secondary storage battery mounted on a vehicle, such as an electric car and a hybrid vehicle, to supply electric power to a driving source for traveling of the vehicle. As illustrated in FIGS. 1 and 2, the battery module 1 includes a battery cell assembly 10, a plurality of bus bars 20, a battery monitoring unit 30, and a pair of end plates 40.

The battery cell assembly 10 includes a plurality of battery cells 11 disposed side by side and has a cuboid shape, including a rectangular parallelepiped shape and a cubic shape. In the following description, an array direction denotes a direction in which the battery cells 11 are disposed side by side in the battery cell assembly 10. The array direction is typically a direction intersecting (e.g., orthogonal to) first both side surfaces facing each other of the battery cell assembly 10. A width direction denotes a direction along the width of the battery cell assembly 10. The width direction is typically a direction intersecting (e.g., orthogonal to) second both side surfaces different from the first both side surfaces of the battery cell assembly 10. A height direction denotes a direction along the height of the battery cell assembly 10. The height direction is typically a direction intersecting (e.g., orthogonal to) an upper surface and a lower surface of the battery cell assembly 10. The lower surface of the battery cell assembly 10 is a surface attached to a vehicle or the like when the battery cell assembly 10 is mounted thereon. The upper surface of the battery cell assembly 10 is a surface opposite to the lower surface. The upper surface side of the battery cell assembly 10 is referred to as an upper side in the height direction, and the lower surface side of the battery cell assembly 10 is referred to as a lower side in the height direction. The array direction, the height direction, and the width direction are substantially orthogonal to one another.

The battery cell assembly 10 is an assembly of a plurality of battery cells 11 and includes the battery cells 11 and an insulating structure 12. The battery cells 11 each include a positive electrode terminal 11a and a negative electrode terminal 11b and have a rectangular parallelepiped shape, for example. The electrode terminals 11a and 11b are provided and exposed on the upper side of each of the battery cells 11 in the height direction. In the battery cell assembly 10, the battery cells 11 are disposed side by side along the array direction, and the electrode terminals 11a and 11b of the battery cells 11 are disposed side by side along the array direction in two rows. In the battery cell assembly 10, for example, the electrode terminals 11a and 11b in each of the rows are disposed side by side along the array direction such that the positive electrodes and the negative electrodes are alternately disposed. The electrode terminals 11a and 11b are provided in a standing manner along the height direction from an electrode mounting surface 14, which will be described later. The battery cell assembly 10 has a flat electrode mounting surface 14 on the upper side in the height direction. The electrode terminals 11a and 11b are not necessarily provided in a standing manner from the electrode mounting surface 14 and may have a planar shape, for example. In this case, to connect the battery cells 11, perforated bus bars are placed on the planar electrode terminals and welded by laser, for example.

The insulating structure 12 insulates the battery cells 11. The insulating structure 12 includes a plurality of insulating resin plates 12a, for example. The insulating structure 12 sandwiches each of the battery cells 11 with the resin plates 12a from both sides in the array direction, thereby insulating the battery cells 11. In other words, the insulating structure 12 insulates the battery cells 11 by disposing the battery cells 11 and the resin plates 12a alternately in the array direction with each of the resin plate 12a interposed between the adjacent battery cells 11.

The bus bars 20 are members that each electrically connect the electrode terminals 11a and 11b of the battery cells 11. The bus bar 20 is a rectangular plate made of a conductive material, such as metal, and has two terminal insertion holes 21 into which the electrode terminals 11a and 11b are inserted. In the bus bar 20, the positive electrode terminal 11a and the negative electrode terminal 11b disposed side by side in the array direction of the battery cells 11 are inserted into and locked in the respective terminal insertion holes 21. As a result, the bus bar 20 electrically connects the two electrode terminals 11a and 11b disposed side by side. While the bus bars 20 connect the battery cells 11 in series in this example, the present embodiment is not limited thereto. The bus bars 20 include two bus bars 20 one of the two terminal insertion holes 21 of which is not connected to the electrode terminal 11a or 11b. One bus bar 20a is what is called a total positive electrode, and the other bus bar 20b is what is called a total negative electrode.

The battery monitoring unit 30 is a device that monitors the battery state of the battery cells 11. The battery monitoring unit 30 is mounted on the electrode mounting surface 14. The battery monitoring unit 30 is mounted near an end plate 40A provided on a first side of the electrode mounting surface 14, for example.

The battery monitoring unit 30 includes a substrate 31, a monitoring unit housing 32, a coupling connector 33, and bus-bar connecting wires 34. The substrate 31 serves as an electronic circuit provided with various electronic parts and that electrically connects the electronic parts. The substrate 31 is what is called a printed circuit board. The substrate 31 is produced by forming (printing) wiring patterns made of a conductive member, such as copper foil, on an insulating layer made of an insulating material, such as epoxy resin, glass epoxy resin, paper epoxy resin, and ceramic. The monitoring unit housing 32 is a member that accommodates a part of the coupling connector 33 and the substrate 31. The monitoring unit housing 32 is made of insulating resin and has a rectangular parallelepiped shape. The monitoring unit housing 32 has an internal space 32a and accommodates a part of the coupling connector 33 and the substrate 31 in the internal space 32a. By making the thickness of the monitoring unit housing 32 in the height direction as small as possible, the battery monitoring unit 30 is downsized. The monitoring unit housing 32 has a protrusion 32b formed by part of the monitoring unit housing 32 protruding due to the thickness of the coupling connector 33 in the height direction. The protrusion 32b is formed on the lower side in the height direction and the first side in the array direction of the monitoring unit housing 32. The monitoring unit housing 32 accommodates the coupling connector 33 by expanding the internal space 32a by the protrusion 32b.

The coupling connector 33 is a female connector to and from which a male mating connector 2a of an external device is attached and detached. The coupling connector 33 is provided to the substrate 31. The coupling connector 33 includes a terminal 33a and a terminal accommodating part 33c. The terminal 33a is electrically connected to the substrate 31 and extends in the array direction. The terminal accommodating part 33c accommodates the terminal 33a and has an opening 33b. In the coupling connector 33, the terminal 33a is directly connected to the substrate 31. The coupling connector 33 is accommodated in the internal space 32a of the monitoring unit housing 32, and part of the terminal accommodating part 33c is accommodated in the internal space 32a expanded by the protrusion 32b of the monitoring unit housing 32. The opening 33b of the terminal accommodating part 33c is exposed to the outside such that the mating connector 2a can be attached to and detached from the coupling connector 33 along the array direction. The mating connector 2a of an electronic control unit (ECU) 2 serving as the external device, for example, is inserted into the opening 33b along the array direction, whereby the coupling connector 33 is connected to the mating connector 2a.

The bus-bar connecting wires 34 (refer to FIG. 1) are conductive wires that electrically connect the battery monitoring unit 30 and the respective bus bars 20. The electronic parts on the substrate 31 are connected to the bus bars 20 via the respective bus-bar connecting wires 34. With this configuration, the battery monitoring unit 30 monitors the battery state, such as the voltage value and the current value, of the battery cells 11. The battery monitoring unit 30 outputs the results of monitoring the battery state of the battery cells 11 to the ECU 2 via the coupling connector 33.

The pair of end plates 40 is a pair of members provided at both ends of the battery cell assembly 10 in the array direction and that clamps the battery cell assembly 10 from both sides in the array direction. The pair of end plates 40 is made of a metal member, for example, and has a rectangular parallelepiped outer shape. The pair of end plates 40 has a rectangular shape similar to that of the battery cells 11 when viewed in the array direction. The pair of end plates 40 is provided at both ends of the battery cell assembly 10 in the array direction. The pair of end plates 40 is coupled by a coupling bar, which is not illustrated, and clamps the battery cell assembly 10 from both ends. The pair of end plates 40 includes a plate body 41, a plate attachment surface 42, and a plate upper surface 43.

The plate attachment surface 42 is a surface provided at the end of the plate body 41 facing the battery cell 11 and attached to the battery cell 11 at the end of the battery cell assembly 10 in the array direction. The plate attachment surface 42 has a rectangular shape similar to that of the battery cell 11 when viewed in the array direction.

The plate upper surface 43 is a surface provided on the upper side of the plate body 41 in the height direction and having a planar shape. The plate upper surface 43 is positioned on the same side as that of the electrode mounting surface 14 of the battery cell assembly 10. In this example, the plate upper surface 43 is positioned at the same height in the height direction as that of the electrode mounting surface 14 of the battery cell assembly 10. In other words, the plate upper surface 43 is positioned on the same plane as that of the electrode mounting surface 14 of the battery cell assembly 10. The plate upper surface 43 is not necessarily positioned at the same height in the height direction as that of the electrode mounting surface 14 of the battery cell assembly 10.

The end plate 40A on the first side has a recess 44. The recess 44 is a portion formed on the upper side of the plate body 41 in the height direction and recessed from the plate upper surface 43. The recess 44 is positioned substantially at the center of the plate body 41 in the width direction. The recess 44 has a rectangular groove shape when viewed in the array direction. The recess 44 has a depth in the height direction sufficiently large to accommodate at least part of the coupling connector 33. When the battery monitoring unit 30 is mounted on the electrode mounting surface 14, the recess 44 accommodates at least part of the coupling connector 33 in an accommodation space 45 of the recess 44. The coupling connector 33 is positioned between a bottom 46 of the recess 44 and the substrate 31 of the battery monitoring unit 30 (refer to FIG. 2).

As described above, the battery module 1 according to the first embodiment includes the battery cell assembly 10, the battery monitoring unit 30, and the pair of end plates 40. A battery monitoring unit mounting structure 3 includes the pair of end plates 40. In the battery cell assembly 10, the battery cells 11 each including the electrode terminals 11a and 11b are disposed side by side in the array direction, the electrode mounting surface 14 provided with the electrode terminals 11a and 11b is formed, and the battery cells 11 are electrically connected to one another. The battery monitoring unit 30 includes the coupling connector 33 that can be connected to the mating connector 2a of an external device. The battery monitoring unit 30 is mounted on the electrode mounting surface 14 and outputs the battery state of the battery cells 11 to the external device via the coupling connector 33. The pair of end plates 40 is provided at both ends of the battery cell assembly 10 in the array direction and clamps the battery cell assembly 10 from both sides in the array direction. The pair of end plates 40 has the plate upper surface 43 and the recess 44. The plate upper surface 43 is positioned on the same side as that of the electrode mounting surface 14. The recess 44 is recessed from the plate upper surface 43 and accommodates at least part of the coupling connector 33.

With this configuration, the battery module 1 and the battery monitoring unit mounting structure 3 accommodate the coupling connector 33 of the battery monitoring unit 30 in the accommodation space 45 of the recess 44. Consequently, the battery module 1 and the battery monitoring unit mounting structure 3 can reduce the amount of protrusion of the coupling connector 33 in the height direction. With this configuration, the battery module 1 and the battery monitoring unit mounting structure 3 can prevent the battery monitoring unit 30 from protruding upward in the height direction when the battery monitoring unit 30 is mounted on the electrode mounting surface 14. With this configuration, the battery module 1 and the battery monitoring unit mounting structure 3 can prevent the entire battery module 1 from increasing in size in the height direction, thereby reducing the height of the battery module 1. As a result, the battery module 1 and the battery monitoring unit mounting structure 3 can prevent the battery module 1 from increasing in size.

In the battery module 1, the battery monitoring unit 30 includes the substrate 31 provided with an electronic circuit. The coupling connector 33 is positioned between the bottom 46 of the recess 44 and the substrate 31 and provided to the substrate 31 such that the mating connector 2a can be attached to and detached from the coupling connector 33 along the array direction. With this configuration, the battery module 1 can absorb the amount of protrusion of the coupling connector 33 downward from the substrate 31 in the height direction by the recess 44. With this configuration, the battery module 1 can prevent the battery monitoring unit 30 from protruding upward in the height direction when the battery monitoring unit 30 is mounted on the electrode mounting surface 14.

Second Embodiment

The following describes a battery module 1A according to a second embodiment. The battery module 1A according to the second embodiment is different from the first embodiment in the position of a coupling connector 33A of a battery monitoring unit 30A. In the second to fourth embodiments described below, components similar to those of the first embodiment are denoted by like reference numerals, and detailed explanation thereof is omitted.

Figure 3:
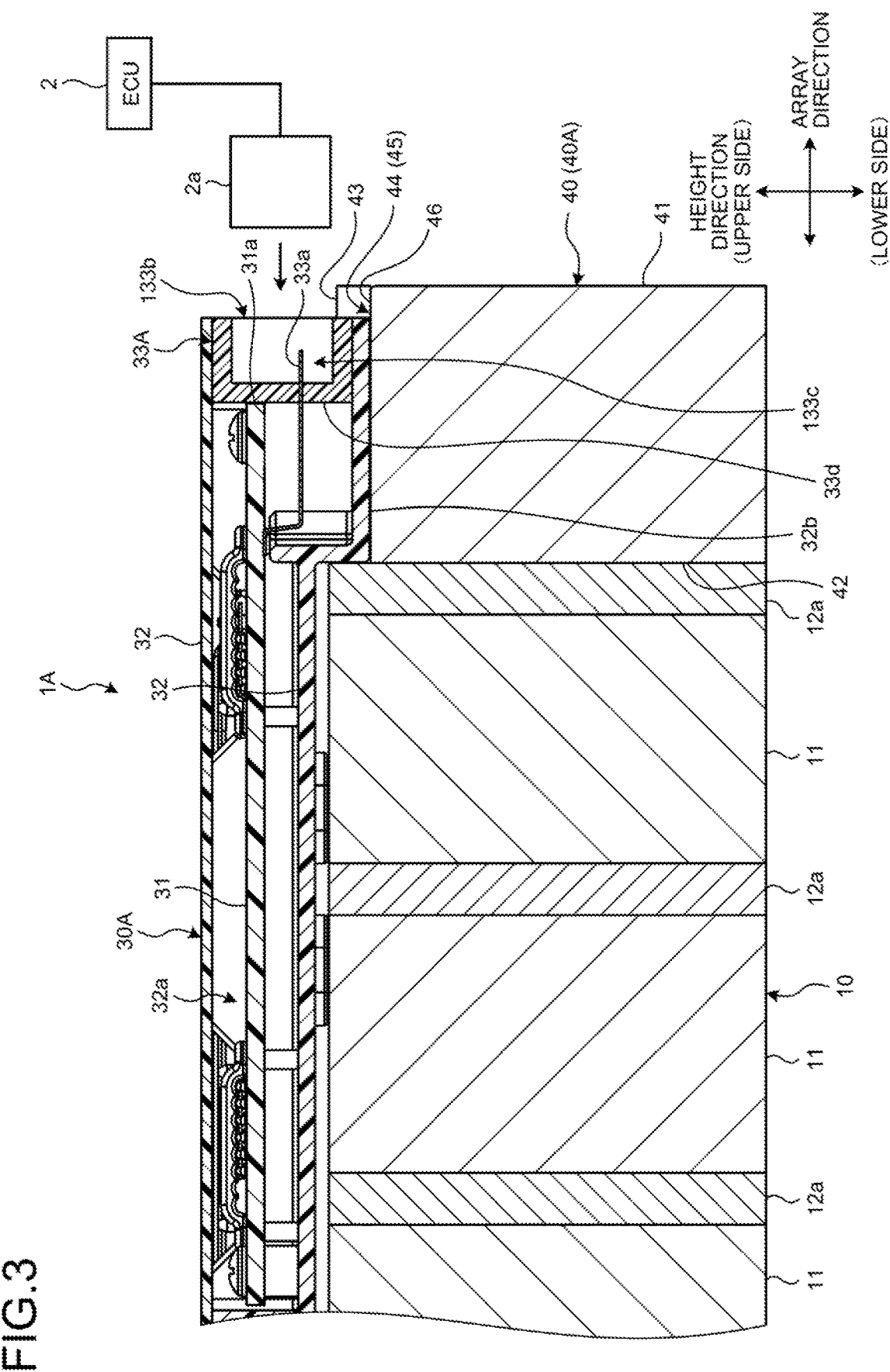
FIG. 3 is a main-part sectional view of an exemplary configuration of the battery module according to a second embodiment.

As illustrated in FIG. 3, the coupling connector 33A according to the second embodiment includes the terminal 33a and a terminal accommodating part 133c. The terminal 33a is electrically connected to the substrate 31 and extends in the array direction. The terminal accommodating part 133c accommodates the terminal 33a and has an opening 133b. The coupling connector 33A is provided to the substrate 31 and positioned at an end 31a of the substrate 31 in the array direction. In other words, the coupling connector 33A is provided to the substrate 31 with a back surface 33d opposite to the opening 133b of the terminal accommodating part 133c facing (in contact with) the end 31a of the substrate 31 in the array direction. In the coupling connector 33A, the terminal 33a is directly connected to the substrate 31. The coupling connector 33A is accommodated in the internal space 32a of the monitoring unit housing 32, and part of the terminal accommodating part 133c is accommodated in the internal space 32a expanded by the protrusion 32b of the monitoring unit housing 32. The opening 133b of the terminal accommodating part 133c is exposed to the outside such that the mating connector 2a can be attached to and detached from the coupling connector 33A along the array direction.

As described above, in the battery module 1A according to the second embodiment, the battery monitoring unit 30A includes the substrate 31 provided with an electronic circuit. The coupling connector 33A is positioned at the end 31a of the substrate 31 in the array direction and provided to the substrate 31 such that the mating connector 2a can be attached to and detached from the coupling connector 33A along the array direction. With this configuration, the battery module 1A can absorb the amount of protrusion of the coupling connector 33A downward from the substrate 31 in the height direction by the recess 44. With this configuration, the battery module 1A can prevent the battery monitoring unit 30A from protruding upward in the height direction when the battery monitoring unit 30A is mounted on the electrode mounting surface 14.

Third Embodiment

Figure 4:
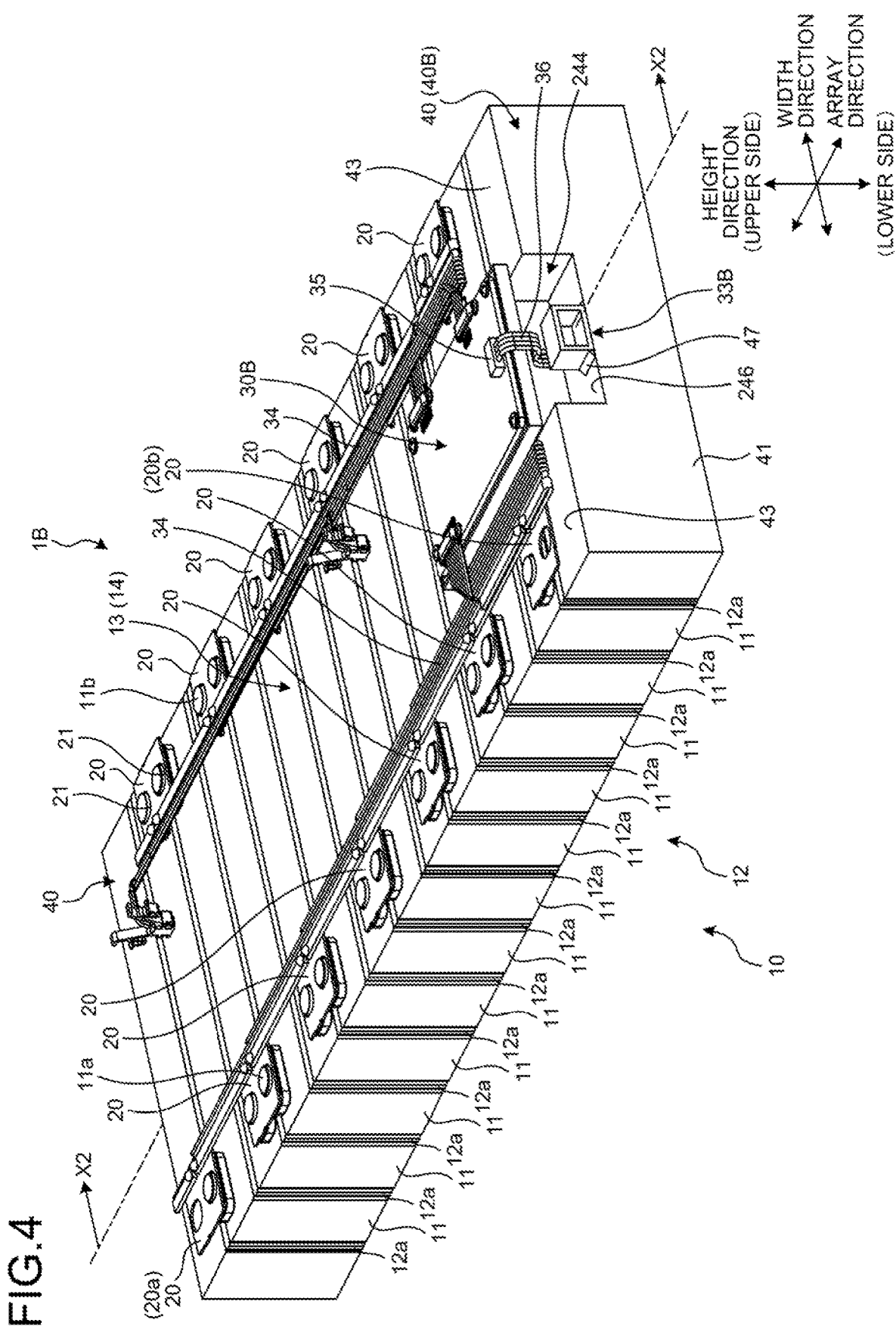
FIG. 4 is a perspective view of an exemplary configuration of the battery module according to a third embodiment.
Figure 5:
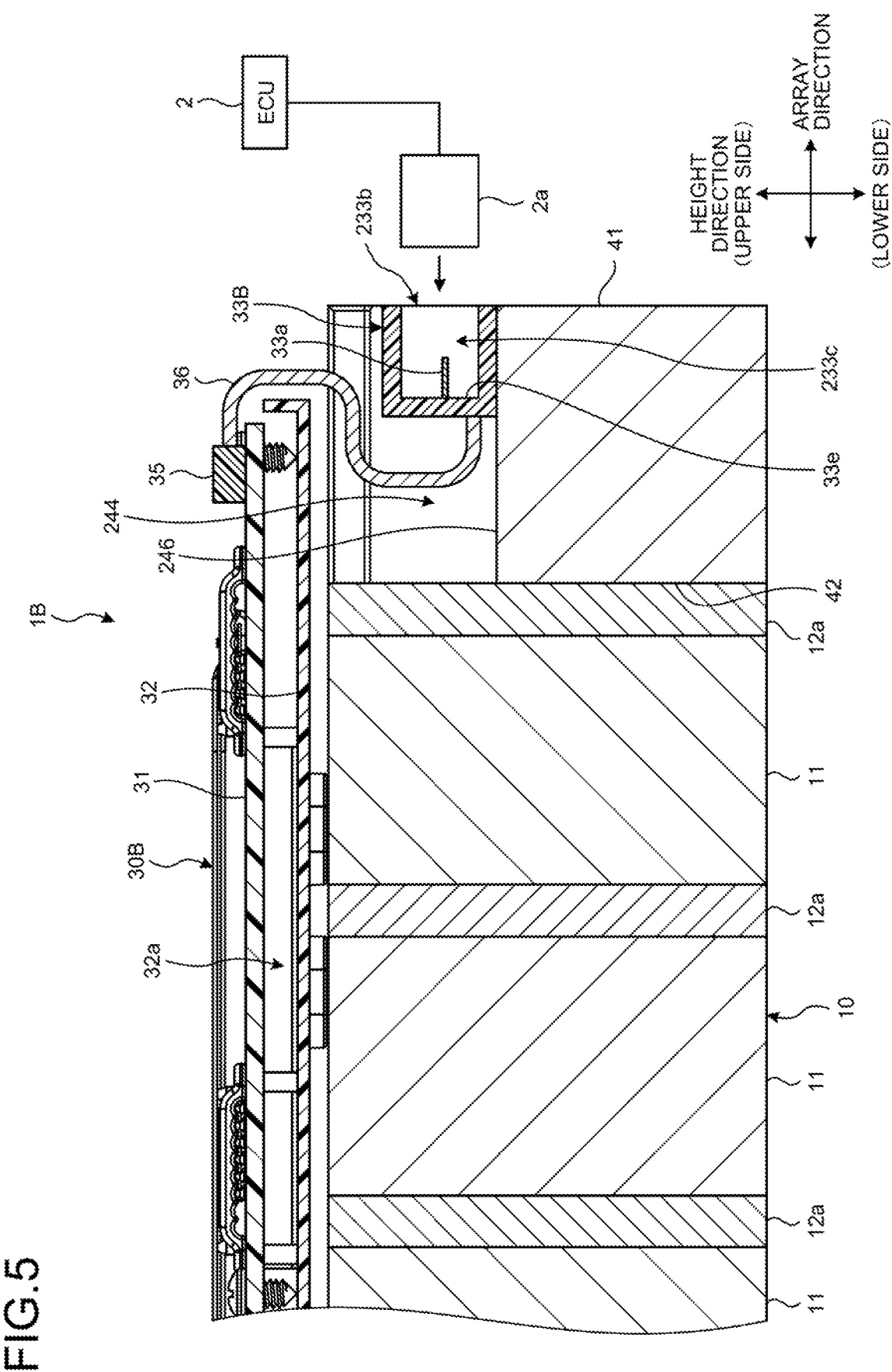
FIG. 5 is a main-part sectional view along line X2-X2 in FIG. 4.

The following describes a battery module 1B according to a third embodiment. The battery module 1B according to the third embodiment is different from the first and the second embodiments in that a coupling connector 33B of a battery monitoring unit 30B is connected to the substrate 31 via a connector coupling wire 36. As illustrated in FIGS. 4 and 5, the battery monitoring unit 30B includes the substrate 31, the monitoring unit housing 32, a substrate coupling connector 35, the connector coupling wire 36, and the coupling connector 33B. To facilitate understanding the explanation, FIGS. 4 and 5 do not illustrate part of the monitoring unit housing 32. The monitoring unit housing 32 has the internal space 32a and accommodates the substrate coupling connector 35 and the substrate 31 in the internal space 32a. By making the thickness of the monitoring unit housing 32 in the height direction as small as possible, the battery monitoring unit 30B is downsized. The monitoring unit housing 32 does not have the protrusion 32b like the monitoring unit housing 32 according to the first embodiment and has a planar shape on the lower side in the height direction.

The substrate coupling connector 35 is provided to and electrically connected to the substrate 31. The substrate coupling connector 35 is electrically connected to a first end of the connector coupling wire 36. The connector coupling wire 36 is a flexible conductive wire harness, for example. The connector coupling wire 36 has a certain length. As described above, the first end of the connector coupling wire 36 is electrically connected to the substrate coupling connector 35, and a second end thereof is electrically connected to the coupling connector 33B. The coupling connector 33B is electrically connected to the substrate 31 via the connector coupling wire 36 and the substrate coupling connector 35. The coupling connector 33B is provided at the end of the connector coupling wire 36 extending from the substrate coupling connector 35 of the substrate 31 and serves as a free end that can be optionally disposed. The entire coupling connector 33B is exposed from the monitoring unit housing 32. The coupling connector 33B includes the terminal 33a and a terminal accommodating part 233c. The terminal 33a is electrically connected to the connector coupling wire 36. The terminal accommodating part 233c accommodates the terminal 33a and has an opening 233b. The terminal accommodating part 233c is provided with the terminal 33a on a bottom surface 33e opposite to the opening 233b. In the terminal accommodating part 233c, the connector coupling wire 36 is electrically connected to the terminal 33a and extends from the bottom surface 33e.

A recess 244 of an end plate 40B on the first side is a portion formed on the upper side of the plate body 41 in the height direction and recessed from the plate upper surface 43. The recess 244 is positioned substantially at the center of the plate body 41 in the width direction. The recess 244 has a rectangular groove shape when viewed in the array direction. The recess 244 has a depth in the height direction sufficiently large to accommodate at least part of the coupling connector 33B. More preferably, the recess 244 has a depth in the height direction sufficiently large to accommodate the entire coupling connector 33B. Specifically, the depth of the recess 244 in the height direction is larger than the length of the coupling connector 33B in the height direction. The recess 244 has a plurality of projections 47 for fixing the coupling connector 33B on a bottom 246. The projections 47 are portions protruding from the bottom 246 of the recess 244 in the height direction and are provided with a gap having a distance equivalent to the size of the terminal accommodating part 233c of the coupling connector 33B in the width direction interposed therebetween. The projections 47 clamp and lock the terminal accommodating part 233c of the coupling connector 33B. The projections 47, for example, catch and lock the terminal accommodating part 233c of the coupling connector 33B with a locking structure, such as a claw. When the battery monitoring unit 30B is mounted on the electrode mounting surface 14, the recess 244 accommodates the entire coupling connector 33B in the accommodation space 45 of the recess 244 with the coupling connector 33B locked by the projections 47 and accommodates a part of the connector coupling wire 36. The connector coupling wire 36 extends along the height direction. The opening 233b of the terminal accommodating part 233c is exposed to the outside such that the mating connector 2a can be attached to and detached from the coupling connector 33B along the array direction. The mating connector 2a is inserted into the opening 233b along the array direction, whereby the coupling connector 33B is connected to the mating connector 2a.

As described above, in the battery module 1B according to the third embodiment, the coupling connector 33B is connected to the substrate 31 via the substrate coupling connector 35 and the connector coupling wire 36. At least part of the coupling connector 33B and part of the connector coupling wire 36 are accommodated in the accommodation space 45 of the recess 244. More preferably, the entire coupling connector 33B is accommodated in the accommodation space 45 of the recess 244. With this configuration, the substrate coupling connector 35 in the battery module 1B can have a simpler structure than the coupling connector 33B because the substrate coupling connector 35 is not connected to the external device. As a result, the substrate coupling connector 35 can be downsized. With this configuration, the battery module 1B can reduce the size of the battery monitoring unit 30B in the height direction. When the battery monitoring unit 30B is mounted on the electrode mounting surface 14, the battery module 1B accommodates the coupling connector 33B in the accommodation space 45 of the recess 244. Consequently, the battery module 1B can prevent the size of the coupling connector 33B from affecting the size of the entire battery module 1B. This configuration can prevent the entire battery module 1B from increasing in size in the height direction, thereby reducing the height of the battery module 1B. The battery module 1B according to the third embodiment may include a plurality of coupling connectors 33B and be connected to another battery module 1B by the coupling connectors 33B.

Fourth Embodiment

Figure 6:
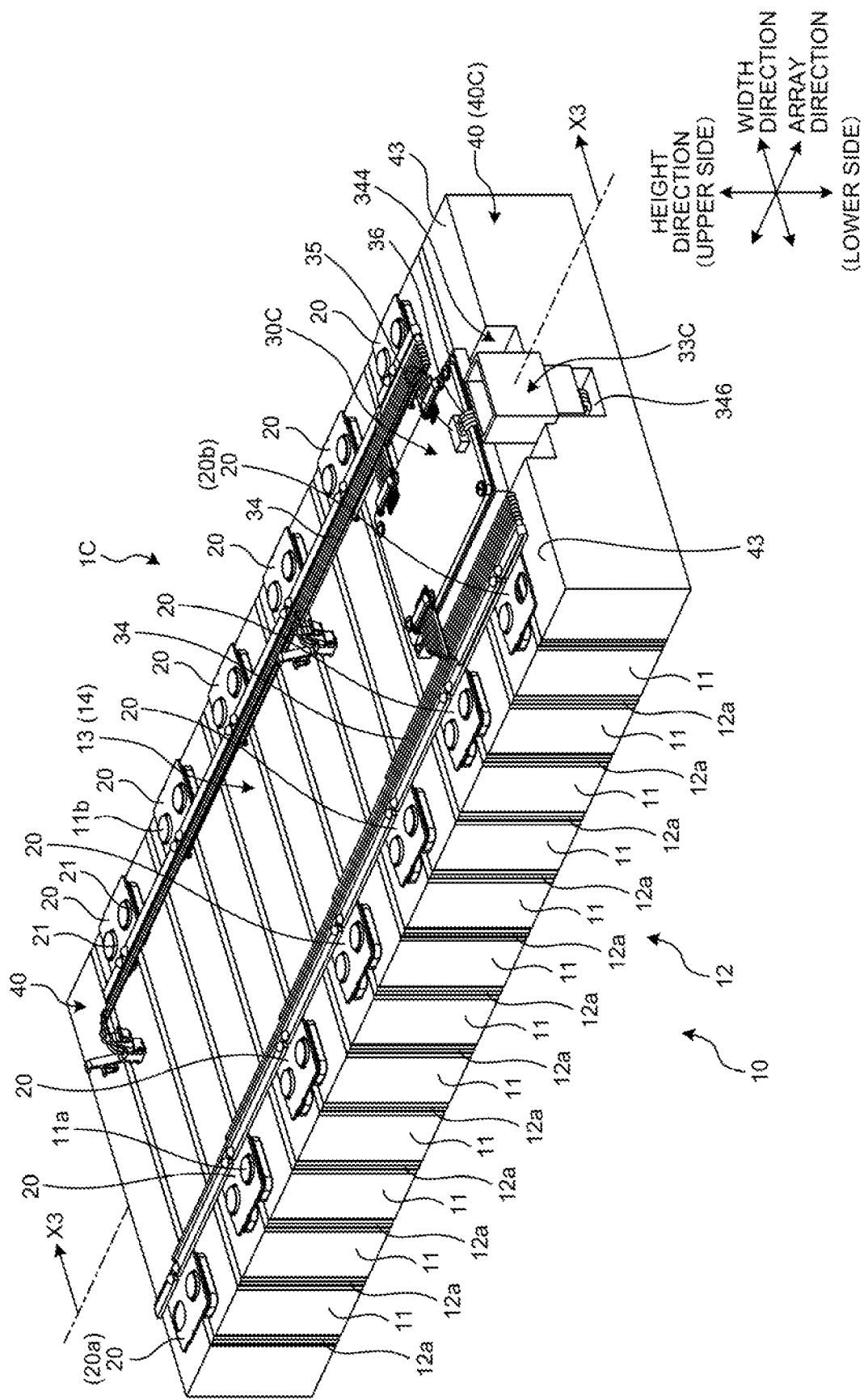
FIG. 6 is a perspective view of an exemplary configuration of the battery module according to a fourth embodiment.
Figure 7:
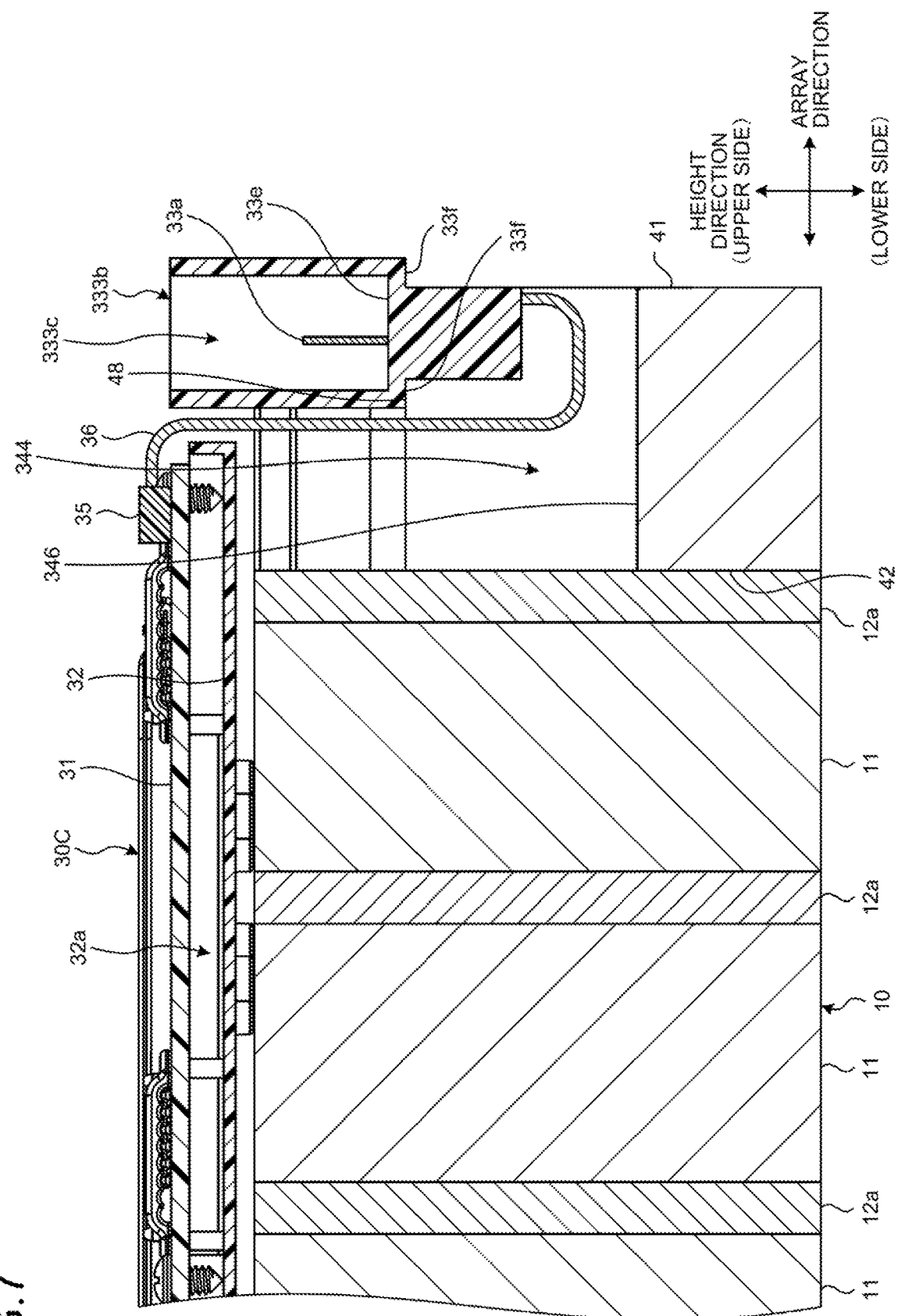
FIG. 7 is a main-part sectional view along line X3-X3 in FIG. 6.

The following describes a battery module 1C according to a fourth embodiment. The battery module 1C according to the fourth embodiment is different from the first to the third embodiments in that the mating connector 2a is attached to and detached from a coupling connector 33C along the height direction. As illustrated in FIGS. 6 and 7, a battery monitoring unit 30C includes the substrate 31, the monitoring unit housing 32, the substrate coupling connector 35, the connector coupling wire 36, and the coupling connector 33C. To facilitate understanding the explanation, FIGS. 6 and 7 do not illustrate part of the monitoring unit housing 32. The monitoring unit housing 32 has the internal space 32a and accommodates the substrate coupling connector 35 and the substrate 31 in the internal space 32a. By making the thickness of the monitoring unit housing 32 in the height direction as small as possible, the battery monitoring unit 30C is downsized. The monitoring unit housing 32 does not have the protrusion 32b like the monitoring unit housing 32 according to the first embodiment and has a planar shape on the lower side in the height direction.

The substrate coupling connector 35 is provided to and electrically connected to the substrate 31. The substrate coupling connector 35 is electrically connected to the coupling connector 33C via the connector coupling wire 36. The coupling connector 33C is provided at the end of the connector coupling wire 36 extending from the substrate coupling connector 35 of the substrate 31 and serves as a free end that can be optionally disposed. The entire coupling connector 33C is exposed from the monitoring unit housing 32. The coupling connector 33C includes the terminal 33a and a terminal accommodating part 333c. The terminal 33a is electrically connected to the connector coupling wire 36. The terminal accommodating part 333c accommodates the terminal 33a and has an opening 333b. The terminal accommodating part 333c is provided with the terminal 33a on the bottom surface 33e opposite to the opening 333b. In the terminal accommodating part 333c, the connector coupling wire 36 is electrically connected to the terminal 33a and extends from the bottom surface 33e. The terminal accommodating part 333c has a step 33f serving as a step in the height direction.

A recess 344 of an end plate 40C on the first side is a portion formed on the upper side of the plate body 41 in the height direction and recessed from the plate upper surface 43. The recess 344 is positioned substantially at the center of the plate body 41 in the width direction. The recess 344 has a groove shape protruding downward when viewed in the array direction. In other words, the recess 344 is a groove having a step in the height direction. The recess 344 has a depth in the height direction sufficiently large to accommodate at least part of the coupling connector 33C. The recess 344 is a groove having a step as described above and has a support surface 48 and a bottom 346 present at a deeper position than the support surface 48. When the battery monitoring unit 30C is mounted on the electrode mounting surface 14, the coupling connector 33C is accommodated in the accommodation space 45 of the recess 344 with the opening 333b of the coupling connector 33C facing upward in the height direction. The recess 344 supports the coupling connector 33C with the step 33f of the terminal accommodating part 333c of the coupling connector 33C brought into contact with the support surface 48. The recess 344 fixes the coupling connector 33C with a locking structure, such as a claw, which is not illustrated. When the coupling connector 33C is fixed, the recess 344 has a space between a bottom 46 of the terminal accommodating part 333c and the bottom 346 of the recess 344. With this space, the recess 344 accommodates a part of the connector coupling wire 36 extending from the bottom 46 of the terminal accommodating part 333c in the accommodation space 45 of the recess 344. The opening 333b of the terminal accommodating part 333c is exposed to the outside such that the mating connector 2a can be attached to and detached from the coupling connector 33C along the height direction. The mating connector 2a is inserted into the opening 333b along the height direction, whereby the coupling connector 33C is connected to the mating connector 2a.

As described above, in the battery module 1C according to the fourth embodiment, the coupling connector 33C is connected to the substrate 31 via the substrate coupling connector 35 and the connector coupling wire 36. At least part of the coupling connector 33C and part of the connector coupling wire 36 are accommodated in the accommodation space 45 of the recess 344. The mating connector 2a is attached to and detached from the coupling connector 33C along the height direction. When the battery monitoring unit 30C is mounted on the electrode mounting surface 14, the battery module 1C accommodates a part of the coupling connector 33C in the accommodation space 45 of the recess 344. Consequently, the battery module 1C can prevent the size of the coupling connector 33C from affecting the size of the entire battery module 1C. This configuration can prevent the entire battery module 1C from increasing in size in the height direction, thereby reducing the height of the battery module 1C. Because the opening 333b of the coupling connector 33C in the battery module 1C faces upward in the height direction, the mating connector 2a can be attached to and detached from the coupling connector 33C along the height direction. The battery module 1C according to the fourth embodiment may include a plurality of coupling connectors 33C and be connected to another battery module 1C by the coupling connectors 33C.

Modifications

The following describes modification of the embodiments. While the battery modules 1, 1A, 1B, and 1C are mounted on a vehicle and supply electric power to the driving source for traveling of the vehicle, for example, they may be used for other purposes.

While the battery monitoring units 30, 30A, 30B, and 30C detect the voltage value and the current value of the battery cells 11, for example, the embodiments are not limited thereto. The battery monitoring units 30, 30A, 30B, and 30C may also detect the temperature of the battery cells 11, for example.

First Reference Example

The following describes an example of electric-wire mounting according to a first reference example. In the example of electric-wire mounting according to the first reference example, a plurality of electric wires 211 of a conductive member 200 are electrically connected to a substrate 100 with solder (refer to FIG. 11). In the following description, an extending direction denotes a direction in which the electric wires 211 extend. An array direction denotes a direction intersecting (e.g., orthogonal to) the extending direction and in which the electric wires 211 are disposed side by side. A height direction denotes a direction orthogonal to a mounting surface of the substrate 100. The extending direction, the array direction, and the height direction are substantially orthogonal to one another.

The conductive member 200 is a flexible flat conductive member having a flat shape, for example. The conductive member 200 is a printed circuit, such as a flat cable (what is called an FC), a flexible flat cable (what is called an FFC), a flexible printed circuit board (what is called an FPC), and a membrane wiring board. In this example, the conductive member 200 is an FFC, for example. The conductive member 200 includes an electric-wire part 210 and flanges 220 and has a long and plate-like outer shape. The electric-wire part 210 includes three electric wires 211 and a covering member 212. The electric-wire part 210 includes the three electric wires 211 disposed side by side in the array direction with a gap interposed therebetween. The electric-wire part 210 is covered with the insulating covering member 212 with ends 211a of the respective electric wires 211 exposed. The flanges 220 are provided on both sides of the electric-wire part 210 in the array direction and formed by flattening the covering member 212.

The substrate 100 serves as an electronic circuit provided with various electronic parts and that electrically connects the electronic parts. The substrate 100 is what is called a printed circuit board. The substrate 100 is produced by forming (printing) wiring patterns made of a conductive member, such as copper foil, on an insulating layer made of an insulating material, such as epoxy resin, glass epoxy resin, paper epoxy resin, and ceramic. The substrate 100 is a multilayered substrate (that is, a multilayer substrate) composed of a plurality of insulating layers provided with the wiring patterns, for example. To improve the connectivity between the wiring patterns and the electric wires 211, the substrate 100 is provided with spare solders 120 on pads (conductive patterns for connection) 110 of the wiring patterns.

Figure 8:
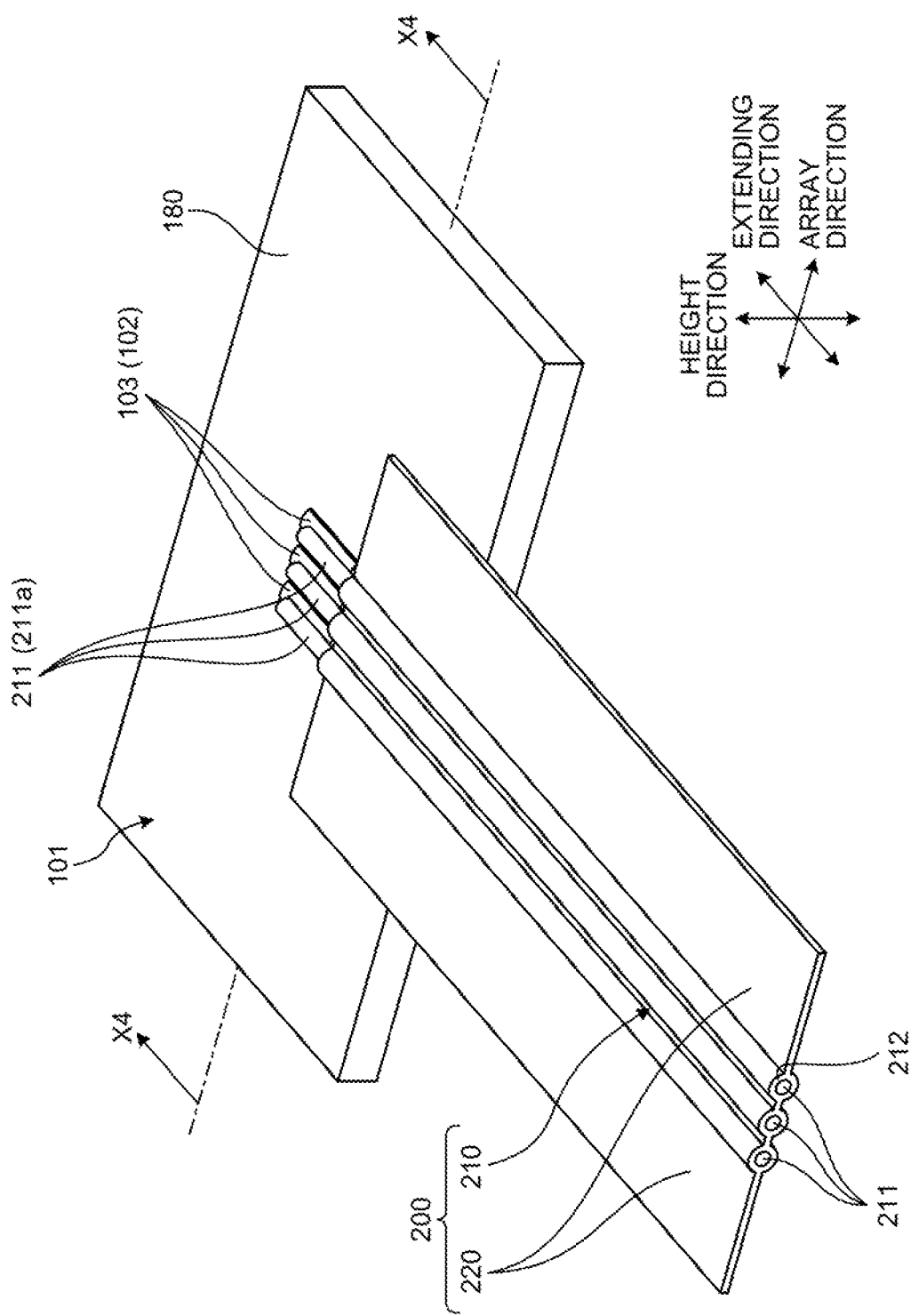
FIG. 8 is a perspective view of an example of electric-wire mounting according to a conventional example.
Figure 9:
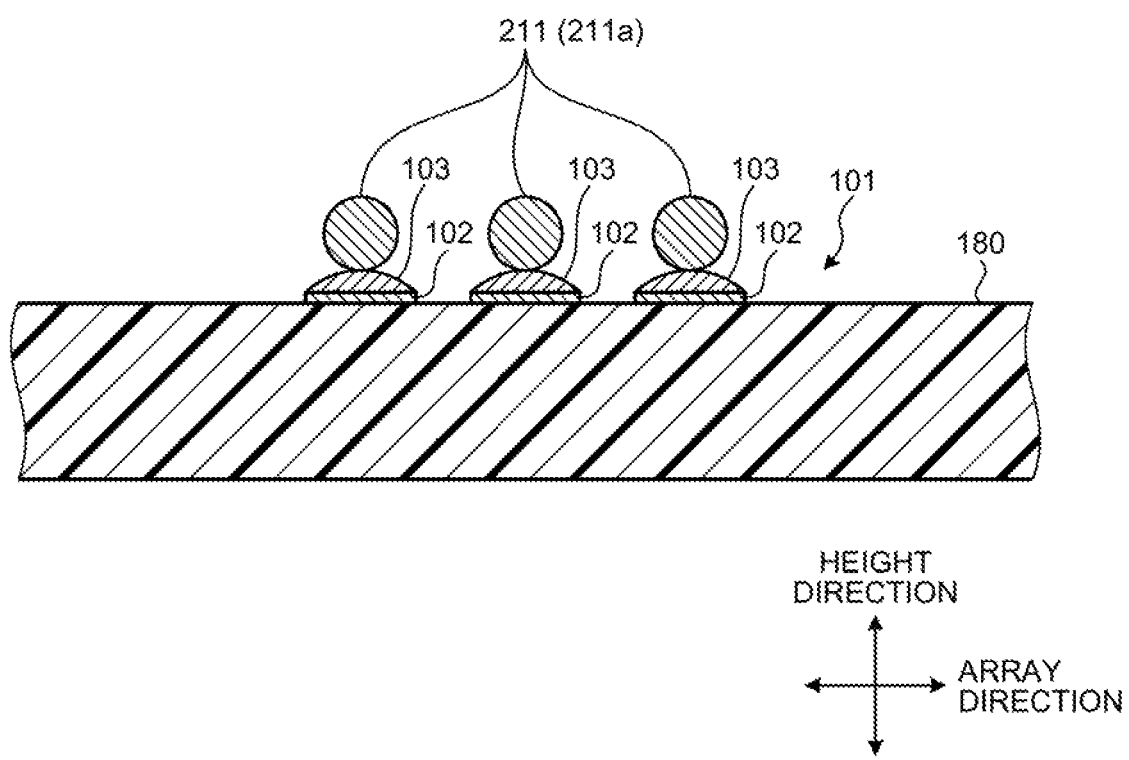
FIG. 9 is a main-part sectional view along line X4-X4 in FIG. 8.

In a substrate 101 according to a conventional example illustrated in FIGS. 8 and 9, for example, one pad 102 having a linear shape is formed for one electric wire 211 on a base material 180, and a spare solder 103 is formed on the pad 102. On the substrate 101, the end 211a of the electric wire 211 is positioned on the spare solder 103 formed on the pad 102. Subsequently, connection solder different from the spare solder 103 is melted together with the spare solder 103, thereby electrically connecting the pad 102 to the end 211a of the electric wire 211. On the substrate 101 according to the conventional example, the surface of the spare solder 103 is curved by surface tension, and the end 211a of the electric wire 211 is positioned on the curved spare solder 103. As a result, the electric wire 211 is made unstable and tends to be misaligned on the substrate 101 according to the conventional example. To avoid the misalignment, the substrate 101 according to the conventional example requires positioning using a jig or firmly holding the electric wire 211.

Figure 10:
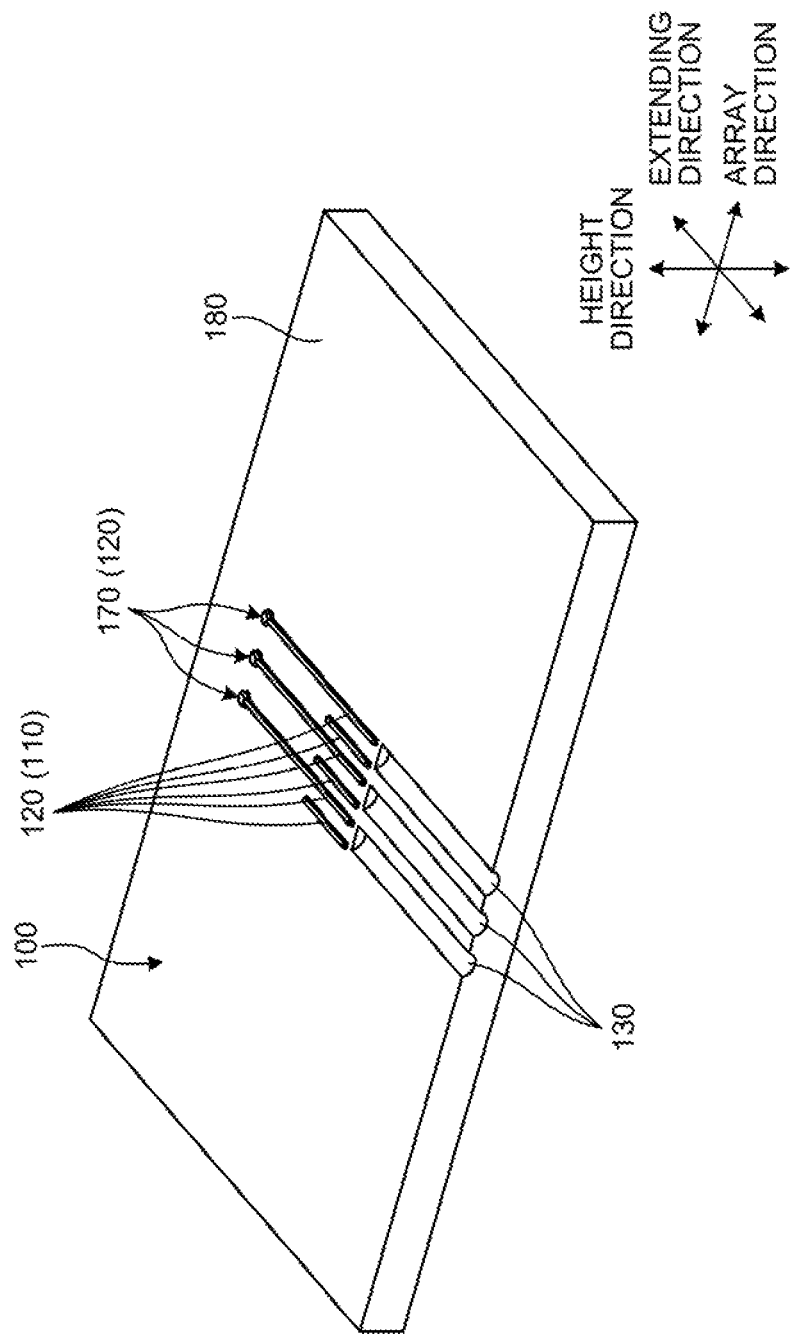
FIG. 10 is a perspective view of an example of formation of a pad according to a first reference example.
Figure 11:
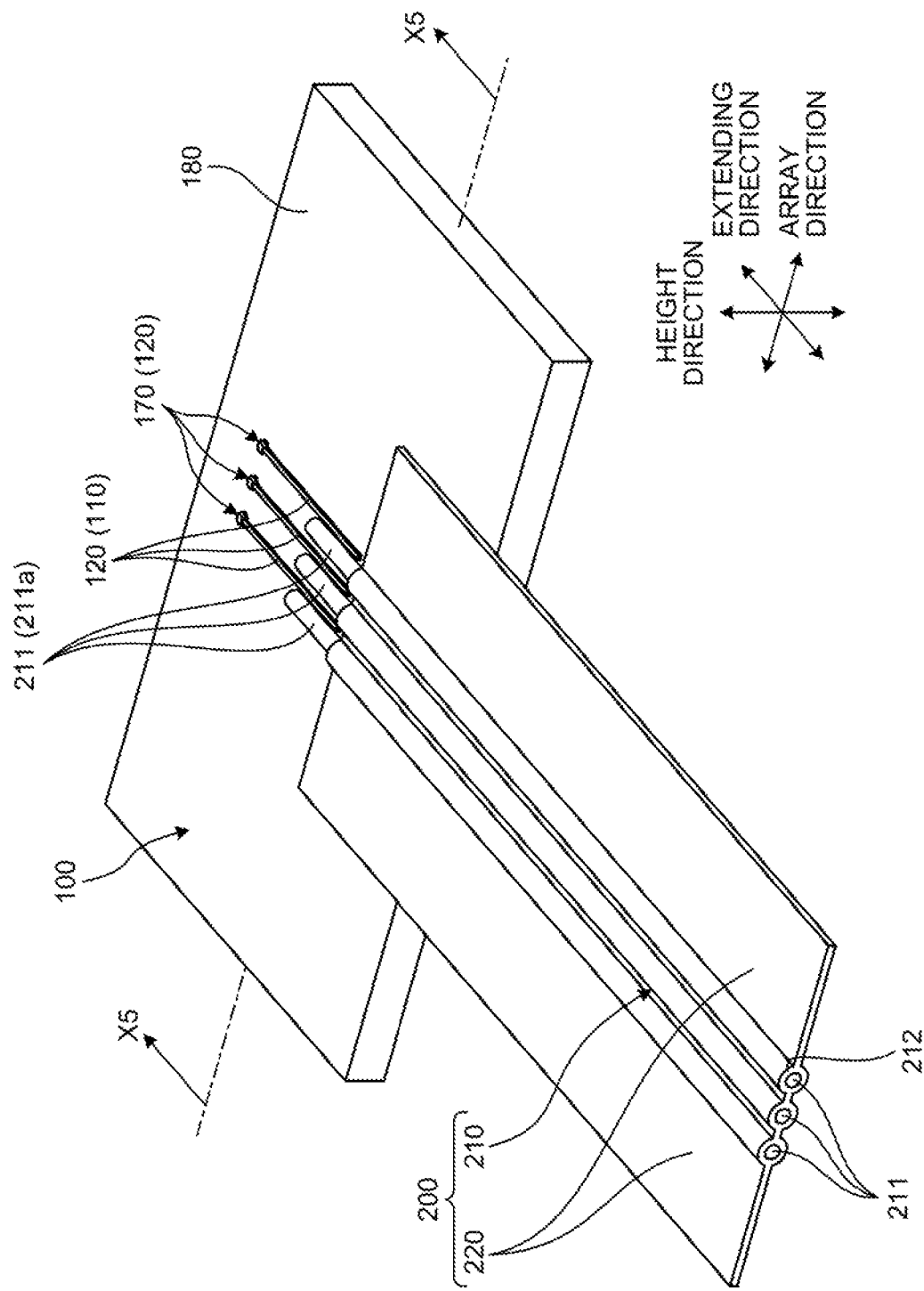
FIG. 11 is a perspective view of an example of electric-wire mounting according to the first reference example.
Figure 12:
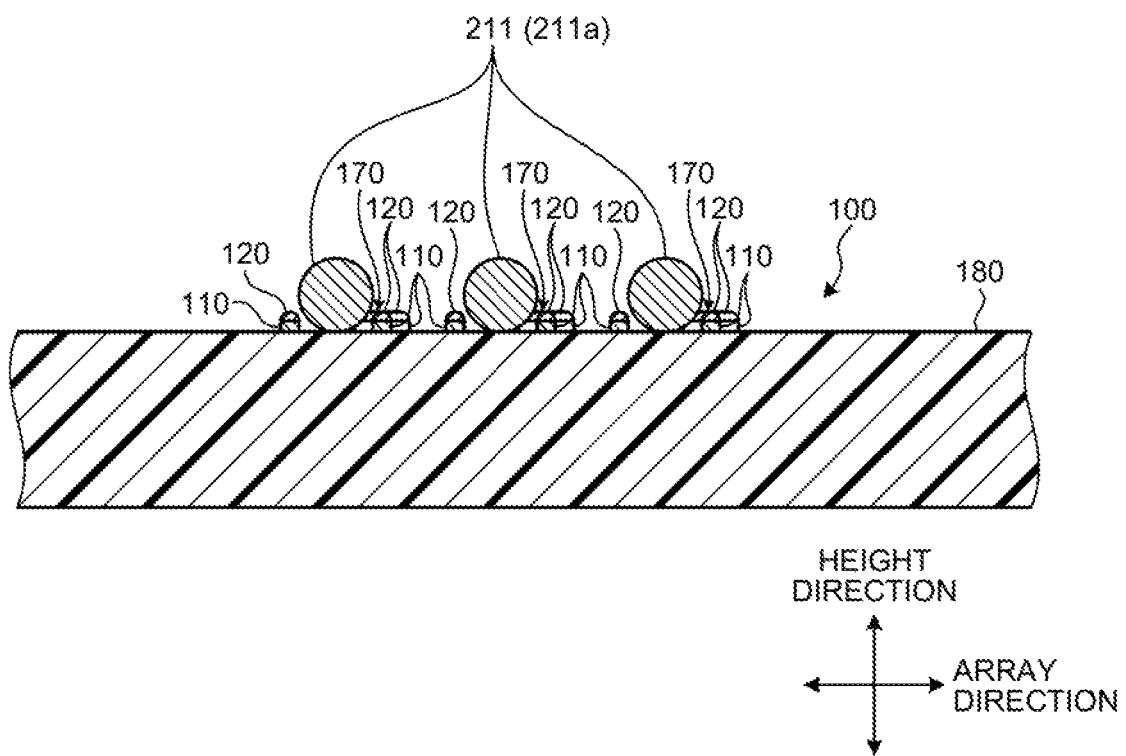
FIG. 12 is a main-part sectional view along line X5-X5 in FIG. 11.

In the substrate 100 according to the first reference example illustrated in FIGS. 10, 11, and 12, two pads 110 having a linear shape are formed for one electric wire 211 on the base material 180 in a manner disposed side by side in the array direction with a gap substantially equal to the diameter of the electric wire 211 interposed therebetween. On the substrate 100, the spare solders 120 are formed on the respective pads 110. On the substrate 100, the end 211a of the electric wire 211 is disposed between the corresponding pads 110, thereby aligning the electric wire 211. After the electric wire 211 is aligned on the substrate 100, the connection solder is melted together with the spare solder 120, thereby electrically connecting the corresponding pads 110 to the end 211a of the electric wire 211. The substrate 100 has recesses 130 at a portion corresponding to the covering member 212 on the base material 180. The recesses 130 are formed to align the position of the covering member 212 of the electric wires 211 and the position of the ends 211a serving as the exposed parts of the electric wires 211 in the height direction on the mounting surface of the substrate 100. The substrate 100 enables aligning the position of the ends 211a in the height direction with the mounting surface by absorbing the thickness of the covering member 212 by the recesses 130. Consequently, the substrate 100 can facilitate aligning the ends 211a. While the position of the ends 211a in the height direction is aligned with the mounting surface by the recesses 130 on the substrate 100, the present reference example is not limited thereto. On the substrate 100, for example, the position of the ends (core wires) 211a in the height direction may be aligned with the mounting surface without the recesses 130 by bending the ends (core wires) 211a toward the mounting surface. One of the adjacent pads 110 is connected to a through hole 170 formed in the substrate 100.

As described above, on the substrate 100 according to the first reference example, the electric wires 211 are each positioned with respect to the corresponding pads 110 by disposing the electric wire 211 between the corresponding pads 110 on which the spare solders 120 are formed. With this configuration, the substrate 100 enables positioning the end 211a of the electric wire 211 in the array direction by sandwiching the end 211a of the electric wire 211 between the corresponding pads 110. Consequently, the substrate 100 can uniquely determine the position of the electric wire 211 with respect to the corresponding pads 110 of the wiring patterns. With this configuration, the substrate 100 can fix the electric wire 211 to the corresponding pads 110 in a stable manner with the spare solder 120 and the connection solder. As a result, the substrate 100 can suppress misalignment of the electric wire 211 with the corresponding pads 110. Furthermore, the substrate 100 does not require positioning between the electric wire 211 and the corresponding pads 110 using a jig or firmly holding the electric wire 211 unlike the conventional example.

Second Reference Example

Figure 13:
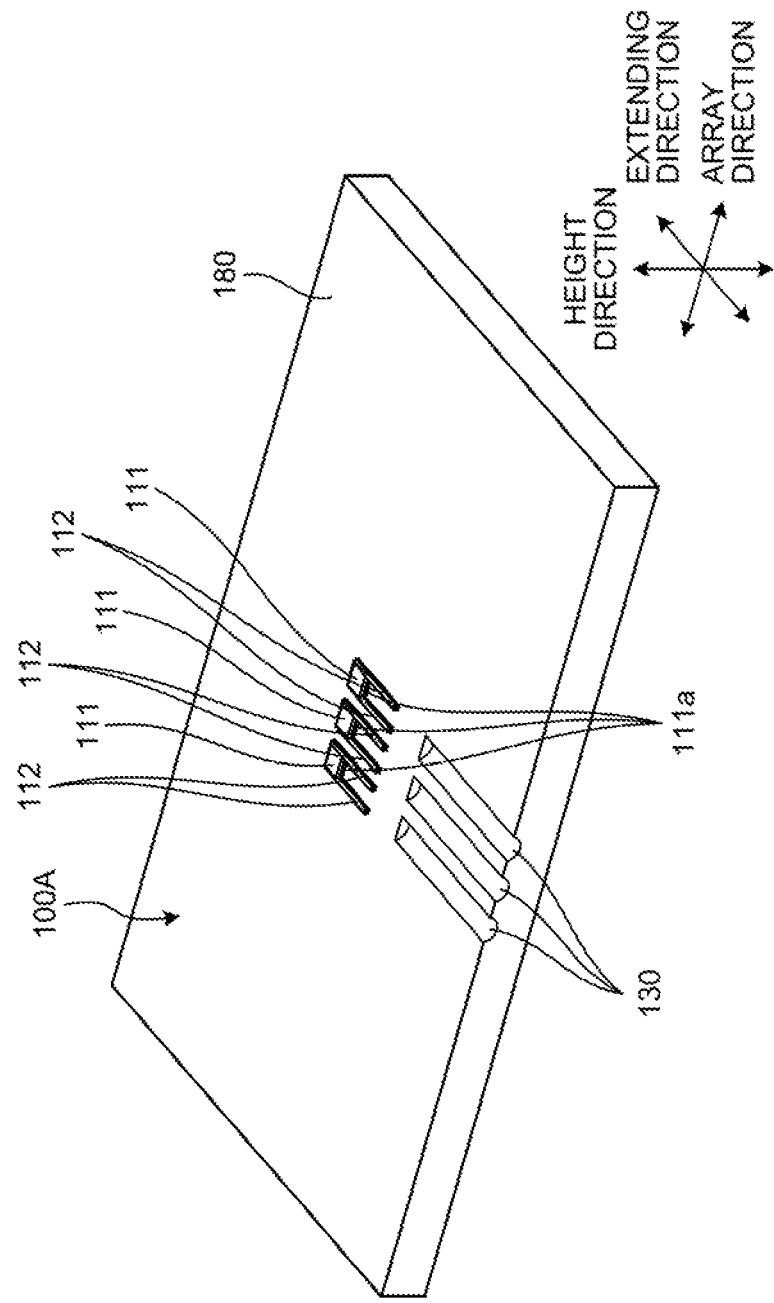
FIG. 13 is a perspective view of an example of formation of a pad according to a second reference example.
Figure 14:
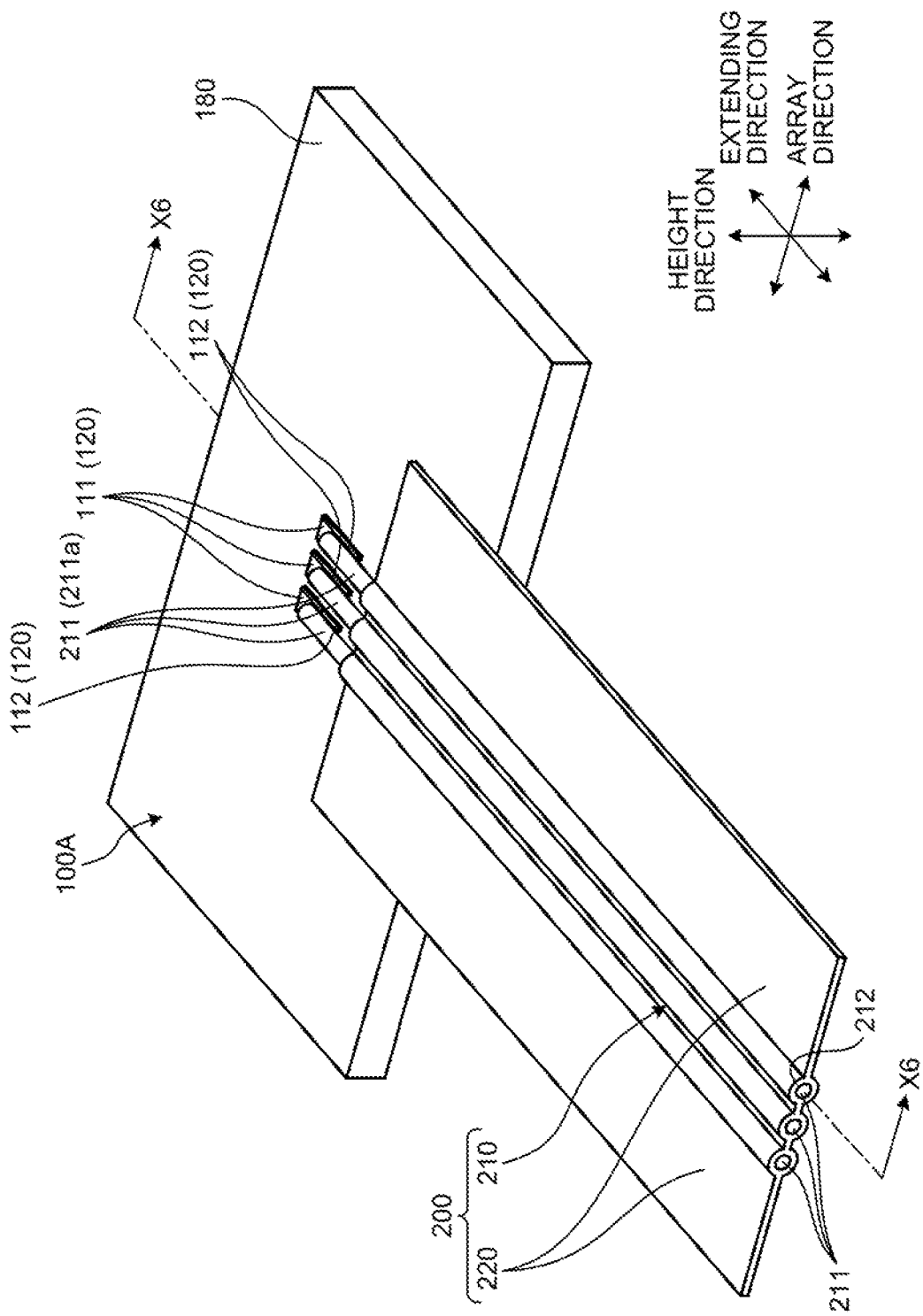
FIG. 14 is a perspective view of an example of electric-wire mounting according to the second reference example.
Figure 15:
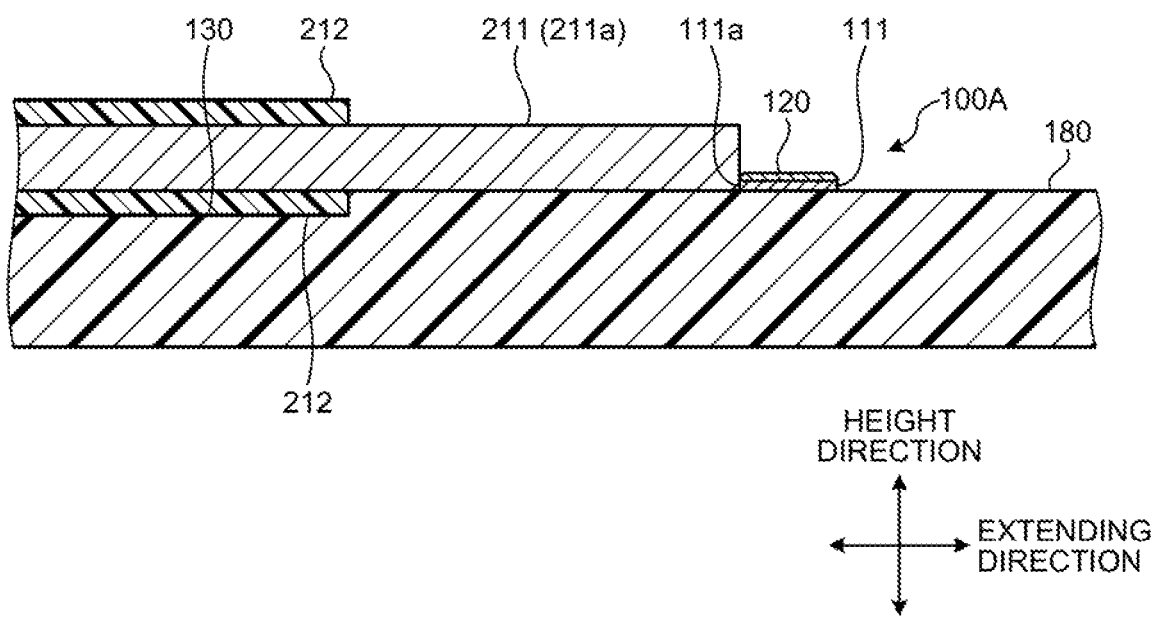
FIG. 15 is a main-part sectional view along line X6-X6 in FIG. 14.

The following describes an example of electric-wire mounting according to a second reference example. In the second to sixth reference examples, components similar to those of the first reference example are denoted by like reference numerals, and detailed explanation thereof is omitted. The second reference example is different from the first reference example in that it includes contact pads 111 with which the ends 211a of the respective electric wires 211 are brought into contact in the extending direction. In a substrate 100A according to the second reference example illustrated in FIGS. 13, 14, and 15, two linear pads 112 having a linear shape are formed for one electric wire 211 on the base material 180 in a manner disposed side by side in the array direction with a gap substantially equal to the diameter of the electric wire 211 interposed therebetween. In addition, the contact pad 111 having an end surface 111a along the array direction is formed on the base material 180 on the back side in the extending direction of the linear pads 112. The contact pad 111 is electrically connected to the pair of linear pads 112 that sandwiches the end 211a of the electric wire 211. The pad composed of the contact pad 111 and the pair of linear pads 112 has a U-shape with rectangular corners when viewed in the height direction. The spare solders 120 are formed on the linear pads 112 and the contact pad 111.

On the substrate 100A, the end 211a of the electric wire 211 is disposed between the corresponding linear pads 112 and brought into contact with the end surface 111a of the corresponding contact pad 111, thereby aligning the electric wire 211. After the electric wire 211 is aligned on the substrate 100A, the connection solder is melted together with the spare solder 120, thereby electrically connecting the linear pads 112 and the contact pad 111 to the end 211a of the electric wire 211.

As described above, on the substrate 100A according to the second reference example, the electric wires 211 are each positioned with respect to the corresponding pads 110 of the wiring patterns by disposing the electric wire 211 between the corresponding linear pads 112 on which the spare solders 120 are formed and bringing the electric wire 211 into contact with the end surface 111a of the corresponding contact pad 111. With this configuration, the substrate 100A enables positioning the end 211a of the electric wire 211 in the array direction by sandwiching the end 211a of the electric wire 211 between the corresponding linear pads 112. Furthermore, the substrate 100A enables positioning the end 211a of the electric wire 211 in the extending direction by bringing the end 211a of the electric wire 211 into contact with the end surface 111a of the corresponding contact pad 111. With this configuration, the substrate 100A can uniquely determine the position of the electric wire 211 with respect to the corresponding pads 110 of the wiring patterns. With this configuration, the substrate 100A can fix the electric wire 211 to the corresponding pads 110 of the wiring patterns in a more stable manner with the spare solder 120 and the connection solder.

Third Reference Example

Figure 16:
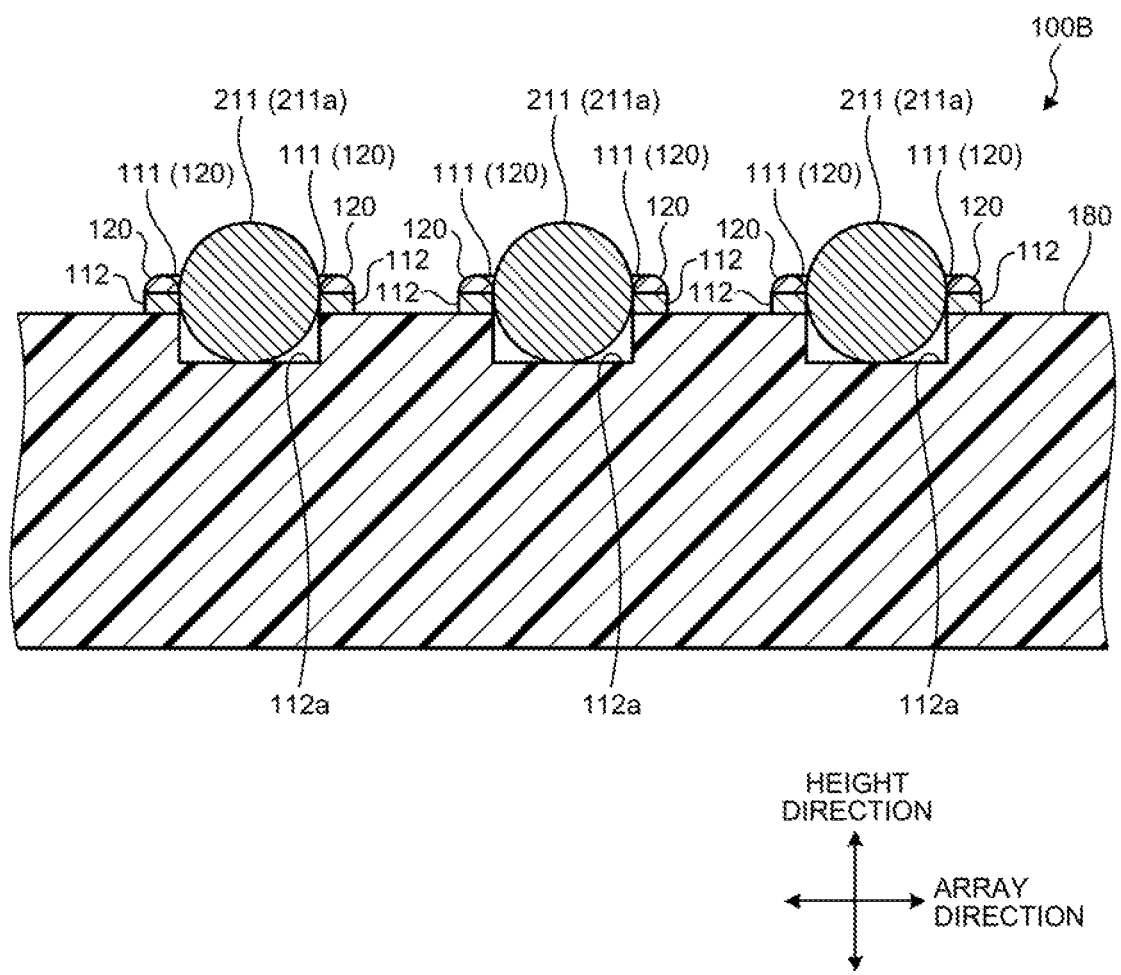
FIG. 16 is a main-part sectional view of an example of electric-wire mounting according to a third reference example.

The following describes an example of electric-wire mounting according to a third reference example. The third reference example is different from the first and the second reference examples in that it includes grooves 112a between the linear pads 112. In a substrate 100B according to the third reference example illustrated in FIG. 16, two linear pads 112 having a linear shape are formed for one electric wire 211 on the base material 180 in a manner disposed side by side in the array direction with a gap substantially equal to the diameter of the electric wire 211 interposed therebetween. On the substrate 100B, the contact pad 111 having the end surface 111a along the array direction is formed on the base material 180 on the back side in the extending direction of the linear pads 112, and the groove 112a is formed on the base material 180 between the linear pads 112 adjacent to the electric wire 211. The groove 112a extends along the extending direction and accommodates a part of the end 211a of the electric wire 211. As described above, the substrate 100B according to the third reference example accommodates a part of the end 211a of the electric wire 211 in the groove 112a. Consequently, the substrate 100B has higher effects for positioning the electric wire 211.

Fourth Reference Example

Figure 17:
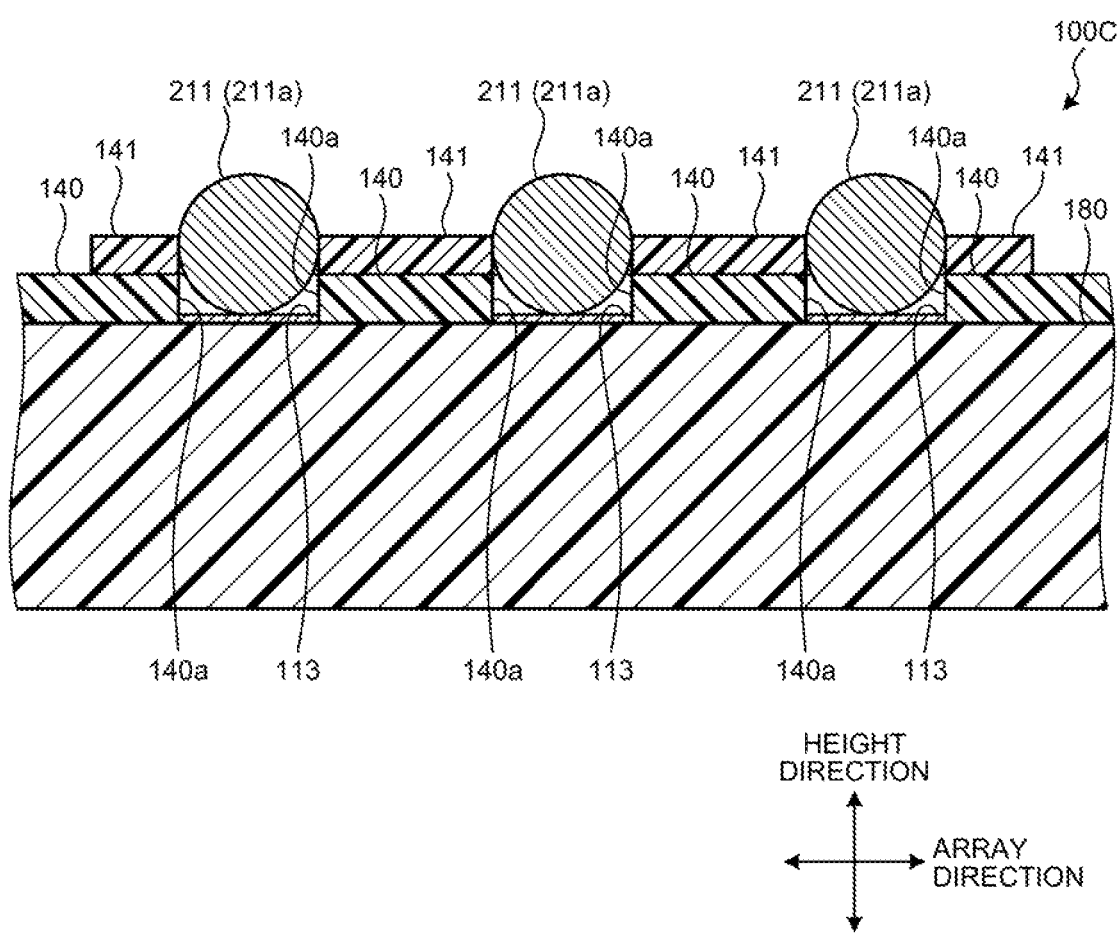
FIG. 17 is a main-part sectional view of an example of electric-wire mounting according to a fourth reference example.

The following describes an example of electric-wire mounting according to a fourth reference example. The fourth reference example is different from the first to the third reference examples in that the electric wires 211 are positioned by resist and silk. In a substrate 100C according to the fourth reference example, a resist layer 140 serving as a protective layer is layered on the base material 180 at a portion not required to be electrically connected to the outside in the wiring patterns including pads 113 of the substrate 100C. In addition, a silk layer 141 used for printing product numbers and the like is layered on the resist layer 140 on the base material 180. On the substrate 100C illustrated in FIG. 17, walls 140a formed by the resist layer 140 and the silk layer 141 are provided on both side of the pads 113 in the array direction. The wall 140a has a height substantially half the diameter of the electric wire 211, and the gap between the walls 140a is substantially equal to the diameter of the electric wire 211. As described above, on the substrate 100C according to the fourth reference example, the electric wires 211 are each positioned with respect to the corresponding pad 113 by disposing the electric wire 211 between the corresponding walls 140a formed by the resist layer 140 and the silk layer 141. With this configuration, the substrate 100C enables positioning the end 211a of the electric wire 211 in the array direction by sandwiching the end 211a of the electric wire 211 between the corresponding walls 140a. Consequently, the substrate 100C can uniquely determine the position of the electric wire 211 with respect to the corresponding pad 113 of the wiring patterns. With this configuration, the substrate 100C can fix the electric wire 211 to the corresponding pad 113 in a stable manner with the connection solder. As a result, the substrate 100C can suppress misalignment of the electric wire 211 with the corresponding pad 113.

Fifth Reference Example

Figure 18:
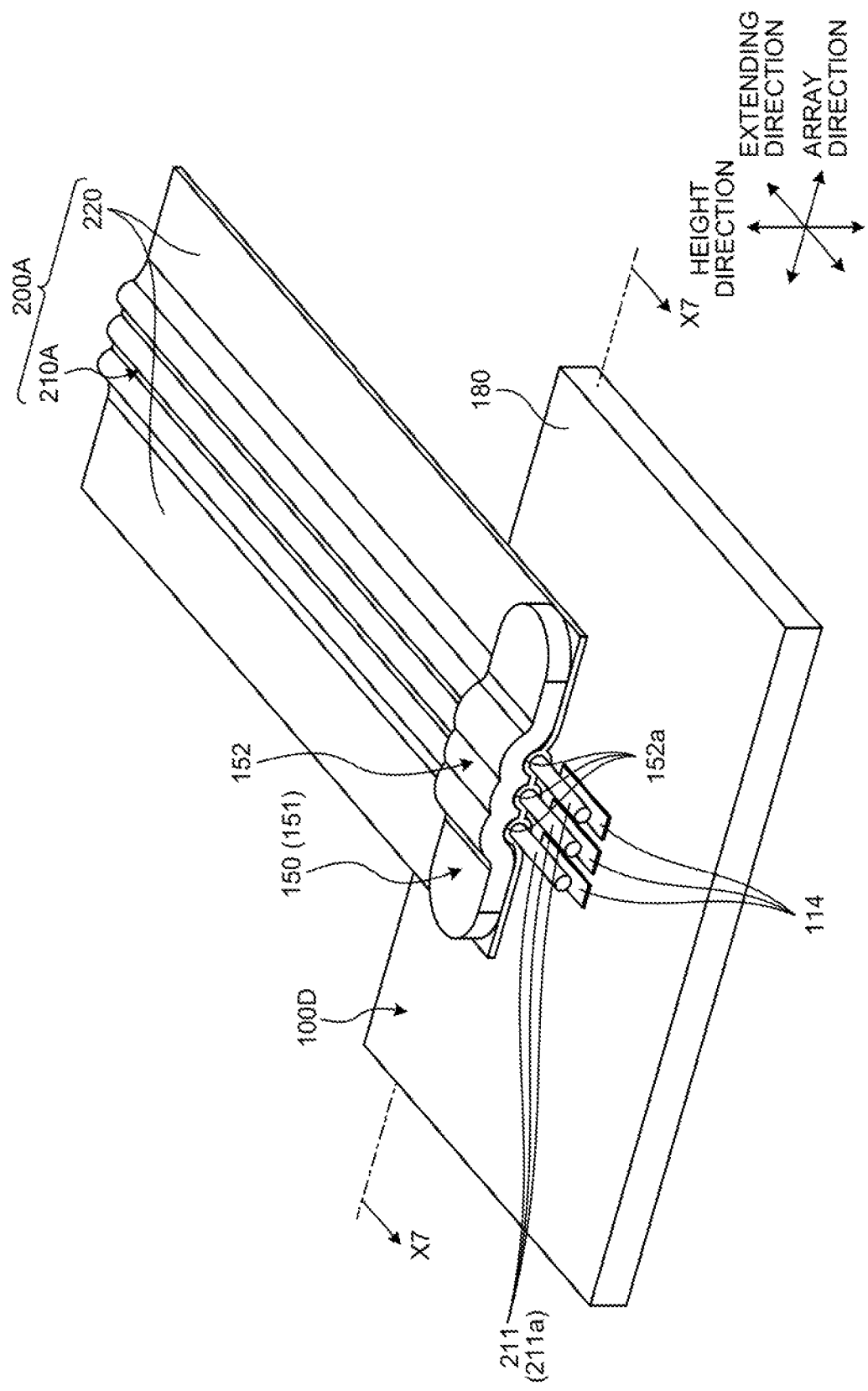
FIG. 18 is a perspective view of an example of electric-wire mounting according to a fifth reference example.
Figure 19:
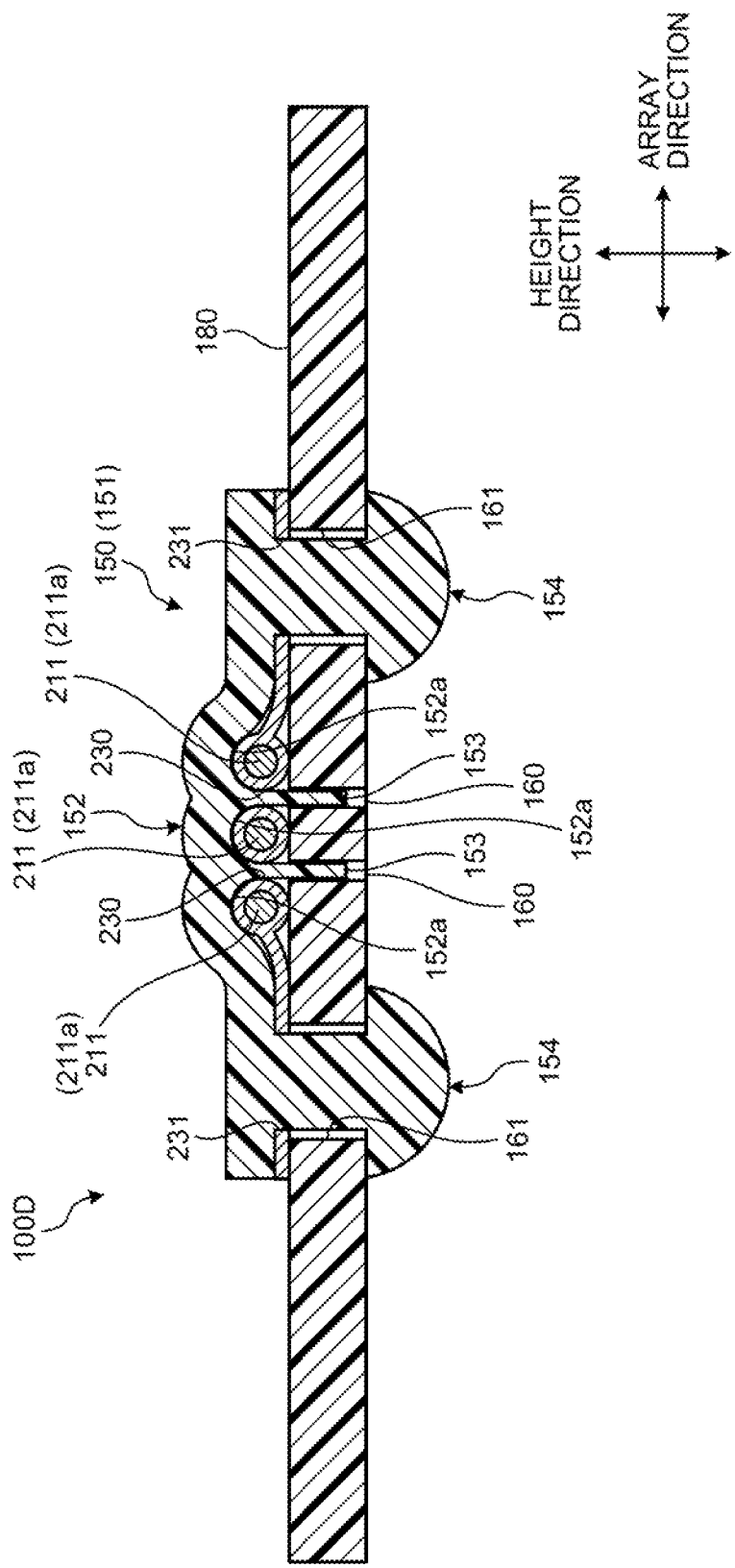
FIG. 19 is a main-part sectional view along line X7-X7 in FIG. 18.

The following describes an example of electric-wire mounting according to a fifth reference example. The fifth reference example is different from the first to the fourth reference examples in that the electric wires 211 are mounted on a substrate 100D by a stapler 150. In the substrate 100D according to the fifth reference example illustrated in FIGS. 18 and 19, pads 114 having a linear shape are formed on the base 180, the ends 211a of the electric wires 211 are aligned with the respective pads 114, and a conductive member 200A is fixed to the substrate 100D by the stapler 150.

The conductive member 200A has first through holes 230 and second through holes 231. The first through holes 230 are formed between the electric wires 211 disposed side by side on the end 211a side of the covering member 212. In this example, two first through holes 230 are formed. The second through holes 231 are formed in the flanges 220 on both sides of an electric-wire part 210A on the end 211a side of the covering member 212. In this example, two second through holes 231 are formed.

The substrate 100D has third through holes 160 and fourth through holes 161. The third through holes 160 and the fourth through holes 161 are holes bored through the substrate 100D. The third through holes 160 are formed at positions communicating with the respective first through holes 230 in the conductive member 200A when the conductive member 200A is aligned with the pads 114 of the substrate 100D. The fourth through holes 161 are formed at positions communicating with the respective second through holes 231 in the conductive member 200A when the conductive member 200A is aligned with the pads 114 of the substrate 100D.

The stapler 150 is made of insulating resin, for example, and includes a stapler body 151, a pressing part 152, positioning rods 153, and fixing parts 154. The stapler body 151 has a rectangular plate shape with curved corners. The pressing part 152 is provided at the center of the stapler body 151 in the longitudinal direction (array direction). The pressing part 152 presses the electric-wire part 210A corresponding to the electric wires 211 covered with the covering member 212 against the substrate 100D. The pressing part 152 has recesses 152a along the extending direction of the electric-wire part 210A, and the recesses 152a come into contact with the outer peripheral surface of the electric-wire part 210A. The pressing part 152 prevents the electric-wire part 210A from moving in the longitudinal direction (array direction) by bringing the recesses 152a into contact with the outer peripheral surface of the electric-wire part 210A.

The positioning rods 153 are members that define the position of the electric-wire part 210A. The positioning rods 153 are rod-like members provided at the center of the stapler body 151 in the longitudinal direction (array direction) and protruding toward a first side in the height direction from the stapler body 151. The positioning rods 153 are provided with a gap substantially equal to the diameter of the covered electric wire 211 of the electric-wire part 210A along the longitudinal direction (array direction) interposed therebetween. In this example, two positioning rods 153 are provided. The positioning rods 153 are inserted into the respective first through holes 230 of the electric-wire part 210A and the respective third through holes 160 of the substrate 100D with the electric-wire part 210A aligned with the pads 114 of the substrate 100D.

The fixing parts 154 are members that fix the stapler body 151 to the substrate 100D. The fixing parts 154 are rod-like members provided on both sides of the stapler body 151 in the longitudinal direction (array direction) and protruding toward the first side in the height direction from the stapler body 151. In this example, two fixing parts 154 are provided. The fixing parts 154 are inserted into the respective second through holes 231 of the conductive member 200A and the respective fourth through holes 161 of the substrate 100D with the conductive member 200A aligned with the pads 114 of the substrate 100D. As described above, the fixing parts 154 are inserted into the respective second through holes 231 and the respective fourth through holes 161, and the ends of the fixing parts 154 on the side opposite to the stapler body 151 protrude from the substrate 100D. Subsequently, the protruding portions are melted to have a larger size than that of the respective fourth through holes 161 of the substrate 100D. With this structure, the fixing parts 154 fix the stapler body 151 to the substrate 100D.

As described above, the substrate 100D according to the fifth reference example fixes the conductive member 200A to the substrate 100D by the stapler 150 with the ends 211a of the electric wires 211 aligned with the respective pads 114. In the stapler 150, the positioning rods 153 are inserted into the respective first through holes 230 of the conductive member 200A and the respective third through holes 160 of the substrate 100D. Consequently, the stapler 150 can suppress misalignment of the conductive member 200A caused by being pulled out in the extending direction. Furthermore, in the stapler 150, the fixing parts 154 are inserted into and locked in the respective second through holes 231 of the conductive member 200A and the respective fourth through holes 161 of the substrate 100D. Consequently, the stapler 150 can suppress misalignment of the conductive member 200A caused by being peeled off from the substrate 100D. With the fixing parts 154, the stapler 150 can also suppress misalignment of the conductive member 200A caused by being pulled out in the extending direction. As a result, the stapler 150 can suppress misalignment of the conductive member 200A compared with the conventional technique that fixes the conductive member 200A to the substrate 100D with an adhesive. With the stapler 150, the present reference example does not require adjusting the application amount of an adhesive and controlling a solvent unlike the conventional technique. As a result, the manufacturing process can be simplified compared with the conventional technique that fixes the conductive member 200A to the substrate 100D with the adhesive. With the stapler 150, the entire substrate can be downsized compared with the conventional technique that couples electric wires to a substrate with a connector.

While the stapler body 151 is fixed to the substrate 100D by melting the ends of the respective fixing parts 154 on the side opposite to the stapler body 151, the present reference example is not limited thereto. As illustrated in FIG. 20, for example, fixing parts 156 may each include a locking claw 155 at the end on the side opposite to the stapler body 151. The locking claw 155 is an elastically deformable member. When no external force is applied, the locking claw 155 protrudes outward from a fixing part body 157 and extends in a tapered manner, for example. When the locking claw 155 is inserted into the fourth through hole 161 of the substrate 100D and applied with external force, the locking claw 155 is folded toward the fixing part body 157. With this structure, when being inserted from one side of the fourth through hole 161 of the substrate 100D, the locking claw 155 is folded toward the fixing part body 157. Subsequently, when coming out from the other side of the fourth through hole 161 of the substrate 100D, the locking claw 155 protrudes outward from the fixing part body 157 and extends in a tapered manner. With this structure, the locking claw 155 can be locked on the back surface of the substrate 100D, thereby fixing a stapler 150A to the substrate 100D. Consequently, the fixing parts 156 does not require the melting process unlike the fixing parts 154, whereby the manufacturing process can be simplified.

A battery module and a battery monitoring unit mounting structure according to the present embodiment include a pair of end plates having a recess that accommodates at least part of a coupling connector of the battery monitoring unit. Consequently, the battery module and the battery monitoring unit mounting structure can prevent the battery module from increasing in size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A battery module comprising:
a battery cell assembly including a plurality of battery cells each including an electrode terminal, disposed side by side in an array direction, and electrically connected to one another, the battery cell assembly having an electrode mounting surface provided with the electrode terminal;
a battery monitoring unit including a coupling connector capable of being connected to a mating connector of an external device, mounted on the electrode mounting surface, and configured to output a battery state of the battery cells to the external device via the coupling connector; and
a pair of end plates provided at both ends of the battery cell assembly in the array direction to clamp the battery cell assembly from both sides in the array direction, wherein
the pair of end plates has a plate upper surface positioned on the same side as the side of the electrode mounting surface and a recess recessed from the plate upper surface to accommodate at least part of the coupling connector,
the coupling connector includes a terminal accommodating part having an opening, the opening is exposed to the outside such that the mating connector can be attached to and detached from the coupling connector along the array direction, and
an end of the opening is located at a position on the battery cell assembly side with respect to an end side in the array direction of the pair of end plates, or is made flush with the end side in the array direction of the pair of end plates.

2. The battery module according to claim 1, wherein
the battery monitoring unit includes a substrate provided with an electronic circuit, and
the coupling connector is positioned between a bottom of the recess and the substrate and provided to the substrate such that the mating connector is capable of being attached to and detached from the coupling connector along the array direction.

3. The battery module according to claim 1, wherein
the battery monitoring unit includes a substrate provided with an electronic circuit, and
the coupling connector is positioned at an end of the substrate in the array direction and provided to the substrate such that the mating connector is capable of being attached to and detached from the coupling connector along the array direction.

4. The battery module according to claim 1, wherein
the recess accommodates an entire of the coupling connector.

5. The battery module according to claim 2, wherein
the recess accommodates an entire of the coupling connector.

6. The battery module according to claim 3, wherein
the recess accommodates an entire of the coupling connector.

7. The battery module according to claim 1, wherein
the battery monitoring unit includes a substrate on which an electronic circuit is formed, and a connector coupling wire connecting the substrate and the coupling connector, and
the recess accommodates a part of the connector coupling wire.

8. The battery module according to claim 2, wherein
the battery monitoring unit includes a substrate on which an electronic circuit is formed, and a connector coupling wire connecting the substrate and the coupling connector, and
the recess accommodates a part of the connector coupling wire.

9. The battery module according to claim 3, wherein
the battery monitoring unit includes a substrate on which an electronic circuit is formed, and a connector coupling wire connecting the substrate and the coupling connector, and
the recess accommodates a part of the connector coupling wire.

10. The battery module according to claim 4, wherein
the battery monitoring unit includes a substrate on which an electronic circuit is formed, and a connector coupling wire connecting the substrate and the coupling connector, and
the recess accommodates a part of the connector coupling wire.

11. A battery monitoring unit mounting structure comprising:
a pair of end plates provided at both ends of a battery cell assembly in an array direction to clamp the battery cell assembly from both sides in the array direction, the battery cell assembly including a plurality of battery cells each including an electrode terminal, disposed side by side in the array direction, and electrically connected to one another, the battery cell assembly having an electrode mounting surface provided with the electrode terminal, wherein
the pair of end plates has:
a plate upper surface positioned on the same side as the side of the electrode mounting surface; and
a recess recessed from the plate upper surface to accommodate at least part of a coupling connector of a battery monitoring unit including the coupling connector capable of being connected to a mating connector of an external device, mounted on the electrode mounting surface, and configured to output a battery state of the battery cells to the external device via the coupling connector,
the coupling connector includes a terminal accommodating part having an opening, the opening is exposed to the outside such that the mating connector can be attached to and detached from the coupling connector along the array direction, and
an end of the opening is located at a position on the battery cell assembly side with respect to an end side in the array direction of the pair of end plates, or is made flush with the end side in the array direction of the pair of end plates.

* * * * *